United States Patent
Melde-Tuczai et al.

(10) Patent No.: US 10,954,849 B2
(45) Date of Patent: Mar. 23, 2021

(54) LENGTH-ADJUSTABLE CONNECTING ROD WITH ELECTROMAGNETICALLY-ACTUATABLE SWITCHING VALVE

(71) Applicant: AVL LIST GMBH, Graz (AT)

(72) Inventors: Helmut Melde-Tuczai, Graz (AT); Mario Theissl, Schwanberg (AT); Siegfried Loesch, St. Stefan ob Leoben (AT); Abdelkarim Redouane, Graz (AT); Florian Bodensteiner, Regensburg (DE); Anamaria Munteanu, Waldenbuch (DE); Miroslaw Robaczewski, Renningen (DE); Katrin Wand, Altdorf (DE)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 16/062,217

(22) PCT Filed: Aug. 10, 2016

(86) PCT No.: PCT/EP2016/069094
§ 371 (c)(1),
(2) Date: Jun. 14, 2018

(87) PCT Pub. No.: WO2017/102108
PCT Pub. Date: Jun. 22, 2017

(65) Prior Publication Data
US 2018/0371988 A1    Dec. 27, 2018

(30) Foreign Application Priority Data

Dec. 14, 2015  (AT) ............................. A 51062/2015
Apr. 29, 2016  (AT) ............................. A 50390/2016
May 31, 2016  (AT) ............................. A 50500/2016

(51) Int. Cl.
F02B 75/04   (2006.01)
F01M 1/06   (2006.01)
(Continued)

(52) U.S. Cl.
CPC .............. *F02B 75/045* (2013.01); *F01M 1/06* (2013.01); *F02D 15/02* (2013.01); *F15B 11/10* (2013.01);
(Continued)

(58) Field of Classification Search
CPC ......... F02B 75/045; F02B 75/04; F01M 1/06; F01M 2001/066; F16C 7/04; F16C 7/06;
(Continued)

(56) References Cited

U.S. PATENT DOCUMENTS 988,344 A    4/1911  Holzmueller
1,610,137 A   12/1926  Kratsch
(Continued)

FOREIGN PATENT DOCUMENTS

AT    511803    3/2013
AT    512334    7/2013
(Continued)

OTHER PUBLICATIONS

International Search Report prepared by the European Patent Office dated Oct. 20, 2016, for International Application No. PCT/EP2016/069094.
(Continued)

*Primary Examiner* — Grant Moubry
*Assistant Examiner* — James G Moubry
(74) *Attorney, Agent, or Firm* — Sheridan Ross P.C.

(57) ABSTRACT

The invention relates to a length-adjustable connecting rod for a reciprocating piston engine, particularly a reciprocating piston internal combustion engine, comprising a hydraulic arrangement with which a length of the connecting rod can
(Continued)

Figure 3:
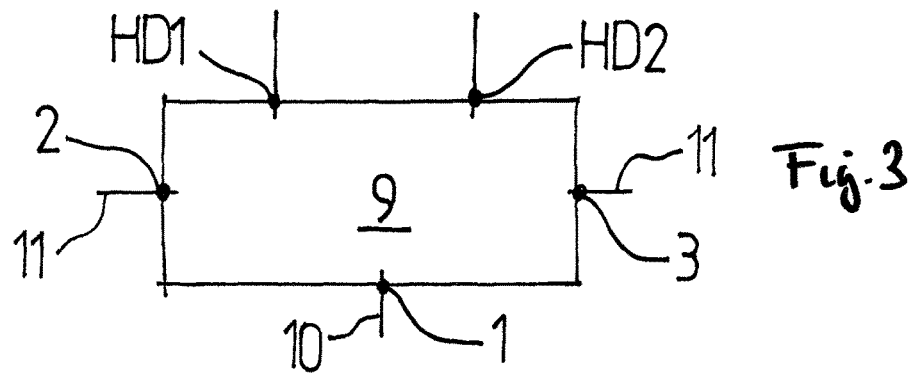

be adjusted, and a switching valve for controlling the inflow and outflow of a hydraulic medium into or out of the hydraulic arrangement, wherein the switching valve can be actuated electromagnetically.

29 Claims, 23 Drawing Sheets

(51) Int. Cl.
  F16C 7/06 (2006.01)
  F16C 7/04 (2006.01)
  F02D 15/02 (2006.01)
  F15B 11/10 (2006.01)
  F15B 13/04 (2006.01)
  F16H 25/20 (2006.01)

(52) U.S. Cl.
  CPC ...... *F15B 13/0402* (2013.01); *F15B 13/0406* (2013.01); *F16C 7/04* (2013.01); *F16C 7/06* (2013.01); *F16H 25/2025* (2013.01); *F01M 2001/066* (2013.01); *F15B 2211/7053* (2013.01); *F16C 2360/22* (2013.01)

(58) Field of Classification Search
  CPC ...... F16C 2360/22; F02D 15/00; F02D 15/02; F01B 31/04
  See application file for complete search history.

(56) References Cited

U.S. PATENT DOCUMENTS

| | | | |
|---|---|---|---|
| 2,033,601 A | | 3/1936 | Wohanka |
| 2,134,995 A | * | 11/1938 | Anderson ............ F16O 7/04 123/197.3 |
| 2,217,721 A | | 10/1940 | Anthony |
| 2,252,153 A | | 8/1941 | Anthony |
| 2,778,378 A | | 1/1957 | Presnell |
| 2,989,954 A | | 6/1961 | Hulbert |
| 3,171,334 A | | 3/1965 | Rasmussen |
| 4,124,002 A | * | 11/1978 | Crise .............. F02B 75/045 123/78 E |
| 4,140,091 A | * | 2/1979 | Showers, Jr. ...... F02B 75/045 123/78 BA |
| 4,195,601 A | * | 4/1980 | Crise .............. F02B 75/045 123/48 B |
| 4,370,901 A | * | 2/1983 | Bolen .............. F02B 75/045 123/48 B |
| 4,406,256 A | | 9/1983 | Akkerman |
| 5,178,103 A | | 1/1993 | Simko |
| 5,562,068 A | | 10/1996 | Sugimoto et al. |
| 5,724,863 A | | 3/1998 | Kramer et al. |
| 5,960,750 A | | 10/1999 | Kreuter |
| 6,394,048 B1 | | 5/2002 | Styron |
| 6,604,496 B2 | * | 8/2003 | Bartsch ............ F02B 75/045 123/78 E |
| 8,746,188 B2 | | 6/2014 | Wilkins |
| 9,528,546 B2 | * | 12/2016 | Melde-Tuczai ...... F02B 75/045 |
| 9,617,911 B2 | | 4/2017 | Paul |
| 9,670,952 B2 | * | 6/2017 | Melde-Tuczai ...... F02B 75/045 |
| 9,828,909 B2 | | 11/2017 | Paul |
| 9,845,738 B2 | | 12/2017 | Pluta |
| 10,294,859 B2 | * | 5/2019 | Melde-Tuczai ...... F02B 75/045 |
| 2004/0187634 A1 | | 9/2004 | Meyer |
| 2008/0115769 A1 | | 5/2008 | Mason |
| 2008/0251158 A1 | | 10/2008 | Koch |
| 2009/0107467 A1 | | 4/2009 | Berger |
| 2009/0205615 A1 | | 8/2009 | Cannata |
| 2010/0132672 A1 | | 6/2010 | Lee et al. |
| 2010/0218746 A1 | | 9/2010 | Rabhi |
| 2013/0247879 A1 | | 9/2013 | Von Mayenburg |
| 2015/0122077 A1 | | 5/2015 | Melde-Tuczai et al. |
| 2015/0152794 A1 | | 6/2015 | Paul |
| 2016/0177997 A1 | | 6/2016 | Ezaki et al. |
| 2016/0222880 A1 | | 8/2016 | Velazquez |
| 2016/0305471 A1 | | 10/2016 | Wittek |
| 2016/0333780 A1 | | 11/2016 | Kamo et al. |
| 2018/0258846 A1 | | 9/2018 | Kamo et al. |
| 2018/0266313 A1 | | 9/2018 | Melde-Tuczai et al. |
| 2019/0234300 A1 | | 8/2019 | Melde-Tuczai et al. |
| 2019/0242300 A1 | | 8/2019 | Pichler et al. |

FOREIGN PATENT DOCUMENTS

| | | |
|---|---|---|
| AT | 514071 | 10/2014 |
| AT | 517100 | 11/2016 |
| AT | 517112 | 11/2016 |
| AT | 517217 | 12/2016 |
| AT | 517492 | 2/2017 |
| AT | 517619 | 3/2017 |
| AT | 517624 | 3/2017 |
| AT | 517718 | 4/2017 |
| CN | 101109321 | 1/2008 |
| CN | 102330561 | 1/2012 |
| CN | 103047409 | 4/2013 |
| CN | 103398001 | 11/2013 |
| CS | 229539 | 6/1984 |
| DE | 1205390 | 11/1965 |
| DE | 1287345 | 1/1969 |
| DE | 2161580 | 7/1973 |
| DE | 2414020 | 10/1975 |
| DE | 3149306 | 6/1983 |
| DE | 8429462 | 2/1985 |
| DE | 3507327 | 9/1986 |
| DE | 4026492 | 2/1992 |
| DE | 4133188 | 4/1992 |
| DE | 4226361 | 4/1994 |
| DE | 4315463 | 5/1994 |
| DE | 29608749 | 7/1996 |
| DE | 19612721 | 10/1996 |
| DE | 19703948 | 6/1998 |
| DE | 19835146 | 6/1999 |
| DE | 10213890 | 10/2002 |
| DE | 10201601 | 6/2003 |
| DE | 10230427 | 1/2004 |
| DE | 102005036701 | 2/2007 |
| DE | 102005055199 | 5/2007 |
| DE | 102007040699 | 3/2009 |
| DE | 102008038971 | 2/2010 |
| DE | 102010016037 | 9/2011 |
| DE | 102011104934 | 12/2012 |
| DE | 102012020999 | 1/2014 |
| DE | 102013210494 | 12/2014 |
| DE | 102013111617 | 4/2015 |
| DE | 102013113432 | 6/2015 |
| DE | 102014200162 | 7/2015 |
| DE | 102014004987 | 10/2015 |
| DE | 102015001066 | 10/2015 |
| DE | 102014220177 | 5/2016 |
| EP | 0438121 | 7/1991 |
| EP | 1065393 | 1/2001 |
| EP | 2280198 | 2/2011 |
| FR | 2857408 | 1/2005 |
| FR | 2889864 | 2/2007 |
| GB | 161580 | 7/1922 |
| GB | 898268 | 6/1962 |
| GB | 2161580 | 1/1986 |
| JP | S52-9703 | 1/1977 |
| JP | S58-165543 | 9/1983 |
| JP | S61-24804 | 2/1986 |
| JP | 2003-129817 | 5/2003 |
| JP | 2005-267420 | 9/2005 |
| JP | 2010-112286 | 5/2010 |
| JP | 2010-112448 | 5/2010 |
| NL | 7602119 | 9/1977 |
| RU | 2226626 | 4/2004 |
| SU | 1008523 | 3/1983 |
| WO | WO 96/01943 | 1/1996 |
| WO | WO 02/10568 | 2/2002 |
| WO | WO 2012/113349 | 8/2012 |
| WO | WO 2013/092364 | 6/2013 |
| WO | WO 2014/005984 | 1/2014 |
| WO | WO 2014/019684 | 2/2014 |

(56) References Cited

FOREIGN PATENT DOCUMENTS

| WO | WO 2014/188060 | 11/2014 |
|---|---|---|
| WO | WO 2015/055582 | 4/2015 |
| WO | WO 2015/082722 | 6/2015 |
| WO | WO 2015/172168 | 11/2015 |
| WO | WO 2015/193437 | 12/2015 |
| WO | WO 2016/042605 | 3/2016 |
| WO | WO 2016/083592 | 6/2016 |
| WO | WO 2016/103554 | 6/2016 |
| WO | WO 2016/203047 | 12/2016 |
| WO | WO 2017/001229 | 1/2017 |
| WO | WO 2017/025580 | 2/2017 |

OTHER PUBLICATIONS

Official Action for Austria Patent Application No. 50713/2015, dated Jul. 6, 2016, 3 pages.
Official Action for Austria Patent Application No. 51062/2015, dated Oct. 25, 2016, 3 pages.
Official Action for Austria Patent Application No. 51062/2015, dated Jul. 14, 2017, 2 pages.
Official Action for Austria Patent Application No. 50390/2016, dated Oct. 25, 2016, 3 pages.
Official Action for Austria Patent Application No. 50390/2016, dated Feb. 2, 2018, 2 pages.
Search Report for Austria Patent Application No. GM 8003/2017, dated Jan. 27, 2017, 3 pages.
International Search Report for International (PCT) Patent Application No. PCT/EP2016/069092, dated Aug. 11, 2016, 2 pages.
International Search Report for International (PCT) Patent Application No. PCT/EP2016/069093, dated Nov. 8, 2016, 2 pages.
English Translation of the Written Opinion for International (PCT) Patent Application No. PCT/EP2016/069094, dated Nov. 8, 2016, 6 pages.
International Search Report for International (PCT) Patent Application No. PCT/EP2016/069313, dated Nov. 8, 2016, 3 pages.
International Search Report prepared by the European Patent Office dated Feb. 21, 2017, for International Application No. PCT/EP2016/080940.
1 English Translation of the International Preliminary Report on Patentability for International (PCT) Patent Application No. PCT/EP2016/069094, dated Jun. 28, 2018, 8 pages.
English Translation of the International Preliminary Report on Patentability for International (PCT) Patent Application No. PCT/EP2016/080940, dated Jun. 28, 2018, 8 pages.
Official Action with English Translation for China Patent Application No. 201680073147.0, dated Mar. 20, 2020, 13 pages.
Official Action for U.S. Appl. No. 16/306,028, dated Jun. 22, 2020 8 pages.

* cited by examiner

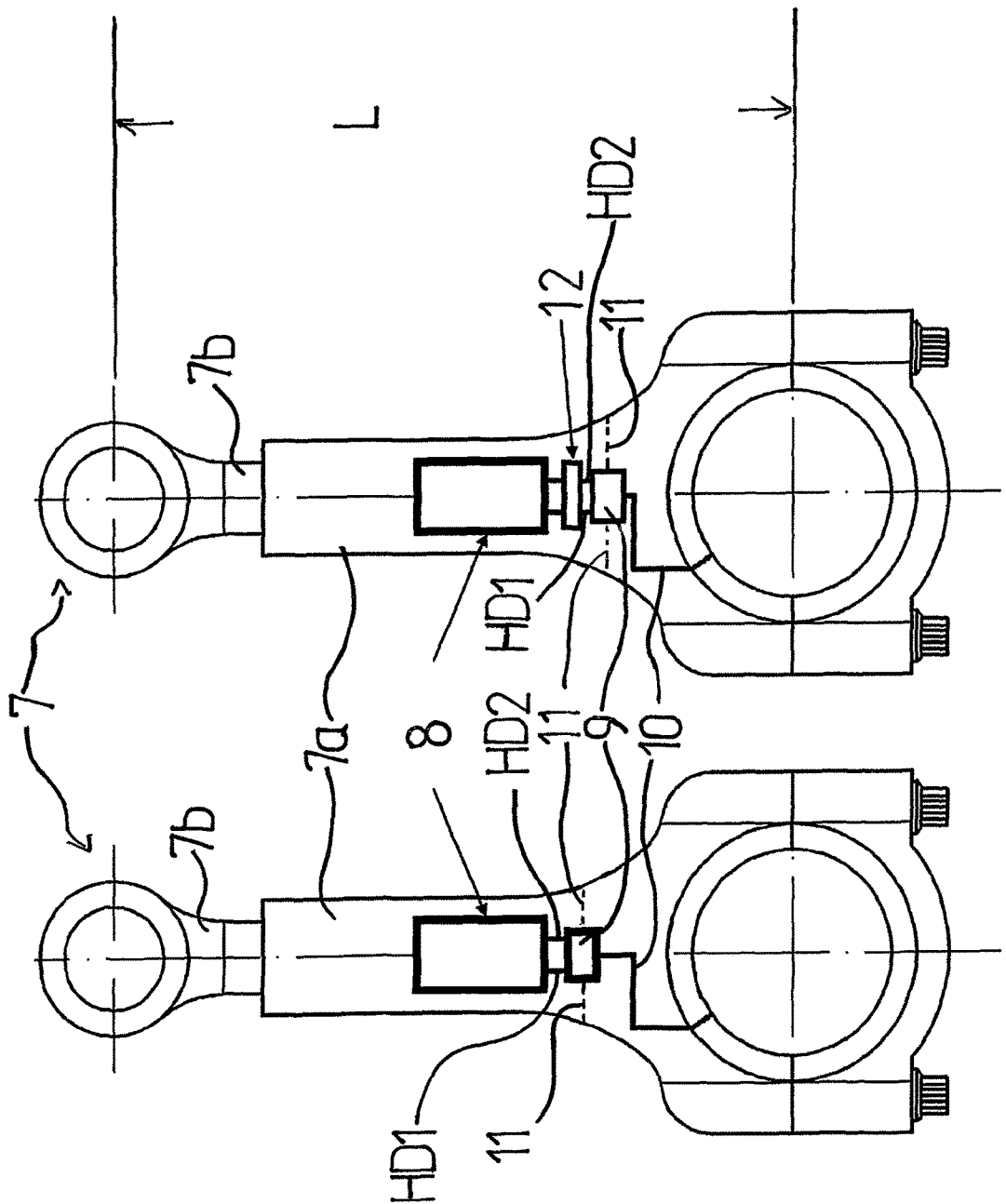

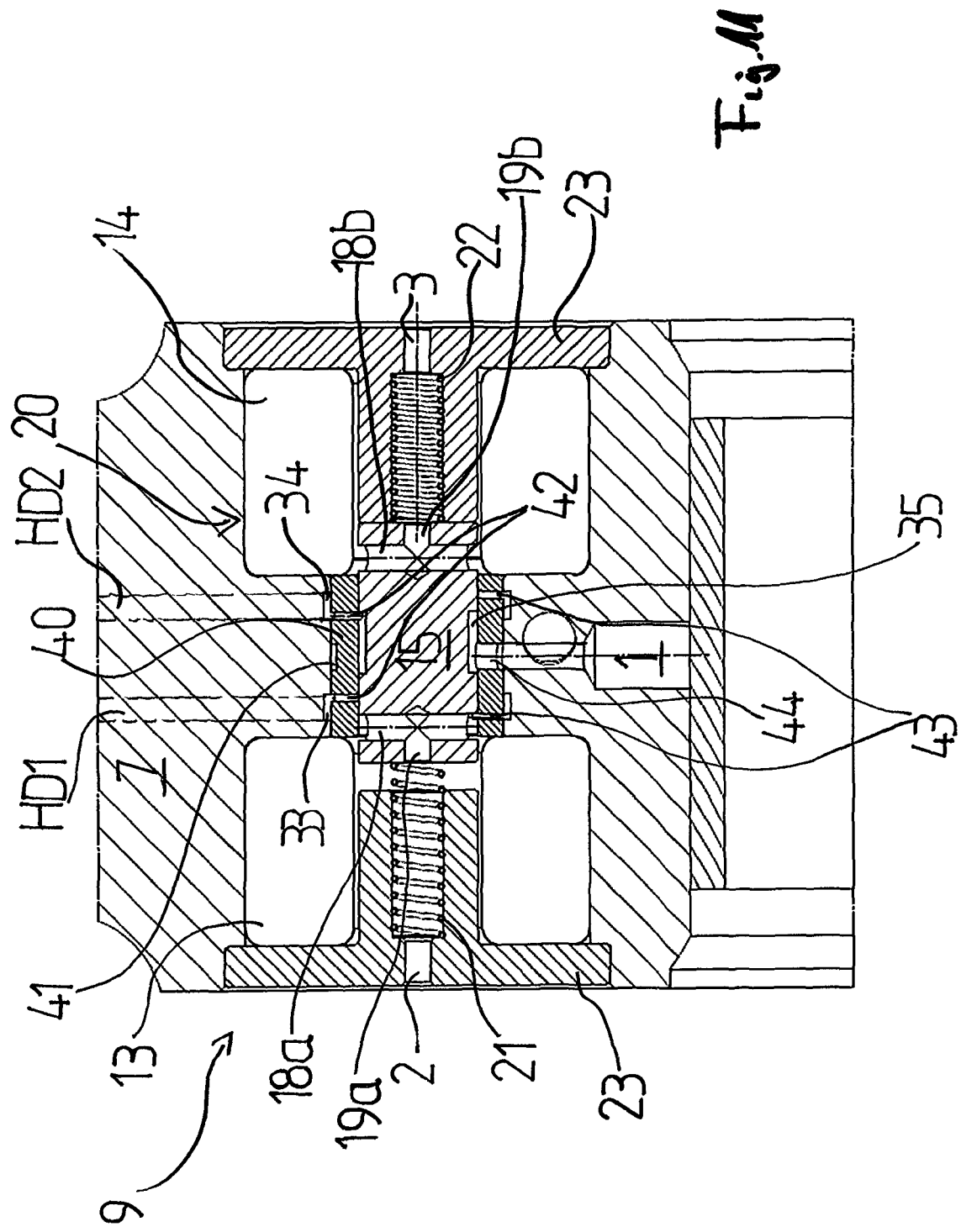
Fig. M

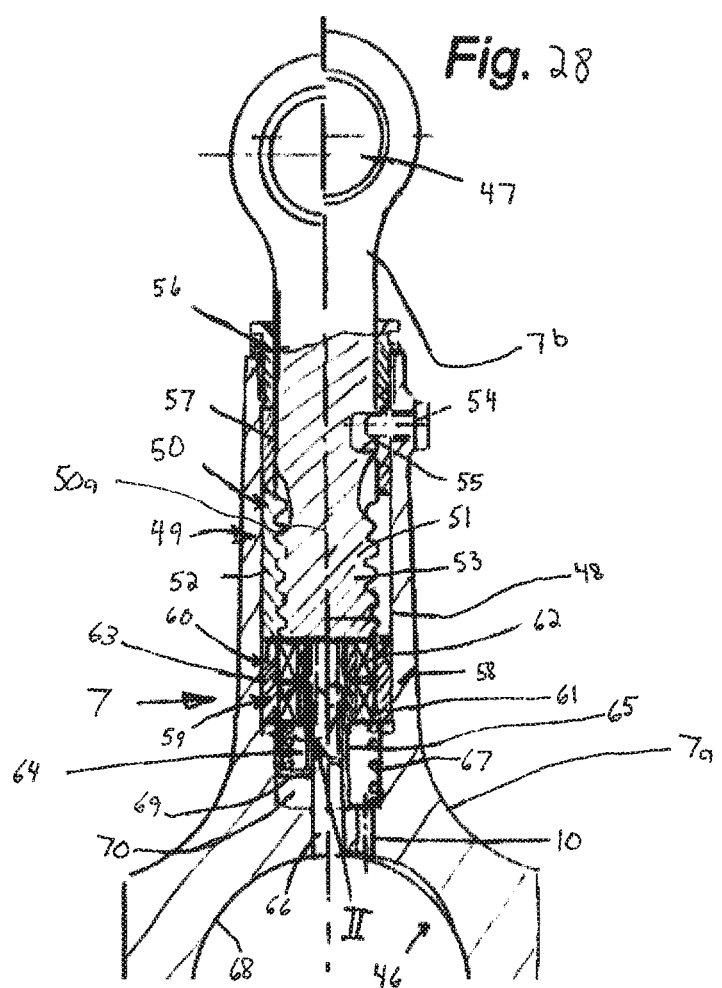

LENGTH-ADJUSTABLE CONNECTING ROD WITH ELECTROMAGNETICALLY-ACTUATABLE SWITCHING VALVE

CROSS REFERENCE TO RELATED APPLICATIONS

This application is a national stage application under 35 U.S.C. 371 and claims the benefit of PCT Application No. PCT/EP2016/069094 having an international filing date of 10 Aug. 2016, which designated the United States, which PCT application claimed priority to Austria Patent Application No. A51062/2015 filed 14 Dec. 2015, Austria Patent Application No. A50390/2016 filed 29 Apr. 2016, and Austria Patent Application No. A50500/2016 filed 31 May 2016, the contents of each of which are incorporated herein by reference in their entireties.

The invention relates to a length-adjustable connecting rod for a reciprocating piston engine, in particular for a reciprocating piston internal combustion engine, comprising a hydraulic device with which a length of the connecting rod can be adjusted and a switching valve for controlling the hydraulic device inflow and outflow.

The invention further relates to a reciprocating piston engine having a connecting rod according to the invention, in particular a reciprocating piston engine designed as a reciprocating piston internal combustion engine, as well as a vehicle having such a reciprocating piston engine.

The connection rod of a reciprocating piston engine generally connects the crankshaft to the piston, whereby the connection rod converts the linear motion of the power or working piston into the circular motion of the crankshaft (linear oscillating axial motion) or, vice versa, a circular into a linear motion.

With smaller connecting rod eyes, the piston is preferably secured by a gudgeon pin, with larger connecting rod eyes, a connecting rod bearing is generally provided via which the connection rod is secured to the rotating crankshaft. A connecting rod shaft is thereby generally arranged between the smaller connecting rod eye, located on the small end, and the larger connecting rod eye, located on the big end.

Adjustable connection rods are in particular used in reciprocating piston engines of variable compression ratio for adjusting the compression ratio. The compression ratio can be changed by adjusting the connection rod length due to the top dead center of the piston movement being shifted. Length-adjustable connection rods are generally known from the prior art, for example from WO 2015/055582 A2, AT 512 334 A1 or DE 10 2012 020 999 A1.

Generally speaking, length-adjustable connecting rods face the problem of how to transfer an actuation or control of the connecting rod's length adjustment from a reciprocating piston engine actuating system to the linearly oscillating moving connection rod.

The following approaches can for example be found in the prior art for a mechanical or respectively hydromechanical transmission:

Printed publication WO 2014/019684 A1 relates to a reciprocating piston internal combustion engine of variable compression having an actuating unit for changing a variable compression of the reciprocating piston internal combustion engine, wherein to change the variable compression, the actuating unit actuates a variable engine component of the reciprocating piston internal combustion engine in the form of a connection rod of variable length, a piston of variable compression height and/or a crankshaft of variable crankshaft radius and the actuating unit is arranged in a lower region of the reciprocating piston internal combustion engine.

Printed publication DE 10 2005 055 199 A1 relates to a reciprocating piston internal combustion engine having at least one adjustably variable compression ratio in a reciprocating piston by means of an adjusting mechanism comprising at least one eccentric arranged in a connecting rod bearing eye or on a crankpin eye of a connection rod for changing an effective length of the connection rod, an eccentric adjustment movement along which the eccentric can be moved by torque induced by the connection rod movement, and at least one variable resistance acting on an adjusting movement of the eccentric and effecting at least a dampened adjustment movement of the eccentric.

In the applicant's PCT/EP 2016/064193, the length adjustment of the connection rod is controlled by the pressure of a hydraulic medium.

One task of the invention is that of providing an improved connecting rod or improved connection rod respectively for a reciprocating piston engine, the operative or effective connection rod length of which can be adjusted. In particular a task of the invention is that of improving the control of the adjustment, in particular making it more reliable. A further particular task of the invention is that of improving the transmitting of an actuating pulse for length adjustment from an actuating system to the connecting rod.

This task is solved by a connecting rod in accordance with claim 1. Advantageous embodiments of the invention are claimed in the dependent claims. The teaching of the claims is hereby made a part of the description.

A first aspect of the invention relates to a length-adjustable connecting rod for a reciprocating piston engine, in particular a reciprocating piston internal combustion engine, comprising:

a hydraulic device with which a length of the connecting rod can be adjusted, and a switching valve for controlling the inflow and outflow of a hydraulic medium into or out of the hydraulic device, wherein the switching valve can be actuated electromagnetically.

A second aspect of the invention relates to a reciprocating piston engine, in particular a reciprocating piston internal combustion engine having such a length-adjustable connecting rod, and a third aspect of the invention relates to a vehicle having a reciprocating piston engine, in particular a reciprocating piston internal combustion engine, comprising such a length-adjustable connecting rod.

A connecting rod in the sense of the invention is an elongated connecting element as usually provided in reciprocating piston engines and arranged between the piston and crankshaft which mechanically connects the piston to the crankshaft.

A reciprocating piston engine in the sense of the invention is a machine with which a piston's linear stroke motion can be converted into a rotational movement of a shaft or, vice versa, a rotational movement of a shaft converted into linear stroke movement of a piston.

Draining in the sense of the invention means enabling a hydraulic medium return flow; i.e. decreasing the hydraulic medium within a working chamber. Draining in particular occurs via an outward flow of hydraulic medium from the hydraulic device. Draining can in particular occur due to forces or pressures external of the connecting rod acting on said connecting rod, for example the ignition process in an internal combustion engine or a movement of the piston resulting from the crankshaft movement, e.g. centrifugal forces at top dead center.

An anchor element in the sense of the invention is the movable part of an electromagnetic actuator, in particular a valve, and preferably comprises ferromagnetic material or magnetizable material, the anchor element in particular consisting of this material. In particular, an anchor element can comprise one or more anchors.

The invention is in particular based on the realization that electromagnetically actuating a switching valve via an electromagnetic control pulse so as to control the inflow of hydraulic medium into the hydraulic device or the outflow of hydraulic medium out of the hydraulic device respectively enables simple transmission of the control pulse to the moving connecting rod. Preferably, the electrical energy required to actuate the switching valve of one such switching valve as well as the actuating pulse itself can be effected by magnetic induction, preferably by way of two coils, wherein one is arranged in the housing of the reciprocating piston engine and one on or in the connecting rod itself.

In contrast to a hydraulic transmission of an actuating pulse via hydraulic medium lines or a mechanical transmission via mechanical adjusting elements, as is known in the prior art, transmission of an electromagnetic actuating pulse can be realized without needing to provide a signal feed to the crankshaft on the large connecting rod eye via a bearing, in particular the main bearing of the connecting rod. In particular, no structural elements thereby need to be provided directly on such a bearing and thus subject to wear caused by rotational movement.

Moreover, nor are there frictional losses due to additional structural elements or due to the actuating pulse itself.

Insofar as actuating energy being inventively diverted off from the movement of the connecting rod by magnetic induction, same is not lost since the switching valve is actuated by same. This actuating energy then saves electrical energy in the generating of an induction field.

In one advantageous embodiment of the inventive connecting rod, same comprises a first connecting rod section and a second connecting rod section, whereby the connecting rod sections are displaceable relative to each other, in particular along a longitudinal axis of the connecting rod, for the adjustment of the connecting rod length. Preferably, the hydraulic device thereby comprises a first hydraulic cylinder having a first pressure chamber and a second pressure chamber separated by a piston, wherein one of the two connecting rod sections is connected to the hydraulic cylinder and the other of the two connecting rod sections is connected to the piston. Preferably, the connecting rod comprises a hydraulic medium supply line and/or a drainage line which can be connected to the first pressure chamber and/or second pressure chamber in fluid communication. In this advantageous embodiment, the length of the connecting rod is directly adjusted by the position of a piston in a hydraulic cylinder. The hydraulic device thereby directly controls the inflow and outflow of the hydraulic medium within the pressure chambers of said hydraulic cylinder. The forces acting along with the movement of the connecting rod are thereby accommodated by the hydraulic cylinder and passed on to the hydraulic medium. Should the hydraulic medium supply line, and if applicable the drainage, be closed off, a change in the length of the connecting rod is prevented. If, on the other hand, the hydraulic medium supply line or drainage respectively is open, particularly by way of the corresponding switch position of the switching valve, a change in the length of the connecting rod can, depending on the forces or pressures applied, be effected.

In a further advantageous embodiment, the length-adjustable connecting rod comprises a first connecting rod section having a nut section and a second connecting rod section having a spindle element section, wherein the nut section and the spindle element section engage and are rotatable relative to each other for adjusting a connecting rod length, in particular along a longitudinal axis of the connecting rod, and wherein the hydraulic device is configured to control a relative rotation of the nut section and the spindle element section, and wherein the connecting rod comprises a hydraulic medium supply line and/or a drainage which can be connected to the hydraulic device in fluid communication. Alternatively or additionally to a hydraulic cylinder with a piston, a threaded gear can be provided for the actual adjustment of the connecting rod length. The threaded gear formed by said threaded gear can thereby be of self-locking or non-self-locking design. If the gear is non-self-locking, the connecting rod length can thus be adjusted by way of the forces acting on the connecting rod from the outside (passive). If, in contrast, the gear is self-locking, the connecting rod length can be adjusted for example by means of a rotary slide valve non-rotatably connected to either the nut section or the spindle element section (active). The provision of the threaded gear enables substantially reducing or even preventing the forces/pressures acting on an electromagnetically actuatable switching valve.

In a further advantageous embodiment of the connecting rod, the hydraulic device further comprises an actuating valve, in particular a slide valve, wherein the switching valve is designed to hydraulically actuate the actuating valve and the actuating valve is designed to open/close a fluidly communicating connection between the hydraulic medium supply line and drainage line and the two pressure chambers or to generate a relative rotation between the nut section and spindle element. Providing an actuating valve additionally to the switching valve which is hydraulically actuated by the switching valve enables forces and/or pressures acting on the length-adjustable connecting rod to be accommodated or reduced respectively by the actuating valve. It is thereby possible to make use of an electromagnetically actuatable switching valve with which, depending on design, it may only take comparatively low forces/pressures to control the hydraulic device.

In a further advantageous embodiment of the length-adjustable connecting rod, an axis of the actuating valve and an axis of the switching valve lie in one plane, in particular, the axes are aligned axially parallel. Preferably, the axes of the valves are respectively aligned such that the lowest possible external forces, e.g. centrifugal forces, act on the moving parts of the valve. In this embodiment, both valves are preferably parallelly aligned.

In a further advantageous embodiment of the length-adjustable connecting rod, one axis of the closing valve and one axis of the switching valve are arranged axially parallel to the crankshaft. In this embodiment, forces arising due to acceleration or deceleration of the connecting rod movement cannot exert any influence on the switching action of the valves.

In a further advantageous embodiment, the actuating valve comprises a second hydraulic cylinder having a first chamber and a second chamber, separated by a control piston, wherein the control piston is configured to actuate at least one closing valve, in particular a ball valve, or is non-rotatably connected to the nut section or the spindle element section. Preferably, the actuating valve can thereby dislodge the ball of the ball valve from a valve seat in order to enable drainage of a pressure chamber. Alternatively, the actuating valve can preferably prevent a rotational movement of a threaded gear from external forces or pressures on the connecting rod (passive) or effect a length adjustment by applying a force on the threaded gear (active).

In a further advantageous embodiment of the length-adjustable connecting rod, the switching valve, in particular a 4/3-way valve, has an inlet, a first outlet, a second outlet, a first switching connection, which is connected in fluid communication to the inlet in a first switched state of the switching valve and to the first outlet in a second switched state of the switching valve, and a second switching connection, which is connected in fluid communication to the inlet in a second switched state of the switching valve or to the second outlet in a first switched state of the switching valve, wherein the switching valve is connected in fluid communication to the hydraulic device via the first switching connection and the second switching connection. Preferably, the first outlet and the second outlet are connected to at least one drainage or form the drainage and the inlet is connected to a hydraulic medium supply line. Providing two switching connections and two outlets enables the switching valve to independently fill or drain two pressure chambers or compartments respectively with hydraulic medium.

In a further advantageous embodiment of the length-adjustable connecting rod, the switching valve comprises:
 an inlet,
 a first outlet, and
 a first switching connection which is connected in fluid communication to the inlet in a first switched state of the switching valve or to the first outlet in a second switched state of the switching valve.

Preferably, the outlet is connected to a drainage or forms the drainage. The inlet is preferably connected to a hydraulic medium supply line. Such a switching valve enables the controlled filling or draining of an actuating valve chamber or hydraulic cylinder pressure chamber. In a system in which the connecting rod is adjusted by means of external forces, the length can be precisely adjusted or established or set respectively depending on the volume of hydraulic medium in the chamber or pressure chamber.

In a further advantageous embodiment of the length-adjustable connecting rod, the first pressure chamber or the first chamber is connected in fluid communication to the first switching connection and the second pressure chamber or second chamber to the second switching connection.

In a further advantageous embodiment of the length-adjustable connecting rod, the switching valve comprises:
 a first coil; and
 an anchor element comprising a ferromagnetic or magnetizable material and movable between exactly two switching positions.

In a further advantageous embodiment of the length-adjustable connecting rod, the anchor element and the first coil are supported in a common accommodation, wherein the anchor element is held in a defined position, preferably a first switching position, by a single restoring device, in particular a spring element which interacts with the accommodation, in particular with cover elements of the accommodation.

An accommodation in the sense of the invention is a unit into which the switching valve is incorporated. An accommodation can in particular be a separate housing or a bore or a cavity, preferably in the connecting rod.

In a further advantageous embodiment of the length-adjustable connecting rod, the switching valve has a neutral position in which the inflow and outflow into and out of the hydraulic device is prevented and preferably no electromagnetic actuation of the switching valve occurs, in particular no electromagnetic induction. This is particularly advantageous since a set connecting rod length can be maintained without needing to actuate the switching valve. In particular, energy can thereby be saved and a reciprocating piston engine can continue to be operated upon a loss of electromagnetic actuation, whereby the last-set length of the connecting rod is maintained.

In a neutral switching position as defined by the invention, the switching connection or switching connections are not connected to either the inlet nor the outlet. In particular, the first switching connection and the second switching connection are not connected to either the inlet nor to one of the outlets in the neutral switching position and are preferably closed.

In a further advantageous embodiment of the length-adjustable connecting rod, the switching valve comprises:
 a first coil and a second coil at a distance from one another, and
 an anchor element comprising a ferromagnetic or magnetizable material and movable between at least two, in particular three switching positions.

In a further advantageous embodiment of the length-adjustable connecting rod, the anchor element and the coils are supported in a common accommodation and the anchor element is held in a defined position, preferably a neutral switching position, by two restoring devices, in particular spring elements which interact with the accommodation, in particular with cover elements of the accommodation.

In a further advantageous embodiment of the length-adjustable connecting rod, the anchor element comprises at least one radial feed hole and at least one axial feed hole connected in fluid communication and configured to fluidly connect the inlet to the first switching connection or to the second switching connection and/or wherein the anchor element comprises at least one radial drainage hole and at least one axial drainage hole connected in fluid communication and configured to fluidly connect the first switching connection to the first outlet and the second switching connection to the second outlet. In this embodiment, the hydraulic medium pressures in the first switching connection or in the second switching connection are exclusively perpendicular to the direction of movement of the anchor element.

These pressures thus preferably ensure that no movement of the anchor element can be induced without electromagnetic actuation, which prevents or at least hinders unintended switching between switching positions.

In a further advantageous embodiment of the length-adjustable connecting rod, the anchor element comprises two axial drainage holes, and radial drainage holes are connected to either the first axial drainage hole or a second axial drainage hole, wherein the radial drainage holes connected to the different axial drainage holes each lie in a different axial plane with respect to the anchor element.

In a further advantageous embodiment of the length-adjustable connecting rod, radial drainage holes connected to the same axial drainage hole line in one plane.

In a further advantageous embodiment of the length-adjustable connecting rod, at least one radial drainage hole connected to the second axial drainage hole connects the second switching connection to the second outlet in the first switched state and at least one radial drainage hole connected to the first axial drainage hole connects the first switching connection to the first outlet in the second switched state.

In a further advantageous embodiment of the length-adjustable connecting rod, the at least one radial feed hole and the at least one radial drainage hole and/or the at least one axial feed hole and the at least one axial drainage hole are arranged in the anchor element so as to have no connection, wherein in particular the at least one radial feed hole and the at least one radial drainage hole lie in a different axial plane with respect to an axis of the anchor element, and wherein the at least one axial feed hole and the at least one axial drainage hole are shifted radially with respect to an axis of the anchor element.

In a further advantageous embodiment of the length-adjustable connecting rod, the anchor element exhibits a first circumferential groove which connects the radial feed holes together in fluid communication. Circumferential grooves allow for not needing to have the openings of the individual elements of the connecting rod be aligned when a fluid connection is to be established between them.

In a further advantageous embodiment, a first gap is present between the anchor element and the housing in the first switched state by means of which a fluid-communicating connection is formed between the inlet and the first switching connection and a second gap is present between the anchor element and the housing in the second switched state by means of which a fluid-communicating connection is formed between the inlet and the second switching connection.

In a further advantageous embodiment of the length-adjustable connecting rod, the anchor element exhibits a first circumferential groove which is configured to fluidly connect the inlet to the first switching connection in a first switched state and to the second switching connection in a second switched state.

In a further advantageous embodiment of the length-adjustable connecting rod, the cover elements or spring plate are affixed to the accommodation by retaining rings.

In a further advantageous embodiment of the length-adjustable connecting rod, the accommodation comprises:
  a first groove which is designed so as to connect the at least one radial feed hole or a radial drainage hole to the first switching connection in the first switched state and/or connect the first circumferential groove of the anchor element to the first switching connection in the second switched state, and
  a second groove which is designed so as to connect the at least one radial feed hole or a radial drainage hole to the second switching connection in the first switched state and/or connect the first circumferential groove of the anchor element to the second switching connection in the second switched state.

In a further advantageous embodiment of the length-adjustable connecting rod, the spring elements are radially arranged internally or externally of the coils with respect to an axis of the anchor element.

In a further advantageous embodiment of the length-adjustable connecting rod, the anchor element comprises a first anchor and a second anchor, each supported by a spring element at a center section of the accommodation. In this embodiment, both anchors can preferably be actuated independently of one another. So doing enables for example functional testing of the switching valve without any length adjustment of the connection rod occurring.

In a further advantageous embodiment, the length-adjustable connecting rod comprises two closure elements, wherein a first closure element is arranged opposite a center section of the accommodation with respect to the first anchor and wherein a second closure element is arranged opposite the center section with respect to the second anchor.

In a further advantageous embodiment, the first closure element comprises radial and axial bores connected to one another and which connect the inlet and the first switching connection in fluid communication in the first switched state and connect the first outlet and the first switching connection in fluid communication in the second switched state, and wherein the second closure element comprises radial and axial bores which connect the inlet and the second switching connection in fluid communication in the second switched state and the second outlet and the second switching connection in fluid communication in the first switched state.

In a further advantageous embodiment of the length-adjustable connecting rod, at least one cavity, in particular at least one axial groove, is formed between the anchors and the accommodation which is preferably formed by anchor elements.

In a further advantageous embodiment of the length-adjustable connecting rod, a first gap is formed between the first closure element and the first anchor in the first switched state which connects the inlet to the radial and axial bores of the first closure element in fluid communication, in particular by way of the cavity, and a second gap is formed between the second closure element and the second anchor in the second switched state which connects the inlet to the radial and axial bores of the second closure element in fluid communication, in particular by way of the cavity.

In a further advantageous embodiment of the length-adjustable connecting rod, the first closure element and the second closure element comprise grooves, in particular circumferential grooves, which are preferably configured to in each case connect multiple radial bores together in fluid communication.

In a further advantageous embodiment of the length-adjustable connecting rod, the anchor elements are guided by the closure elements and/or by the accommodation.

In a further advantageous embodiment, the length-adjustable connecting rod comprises a first covering element which closes the axial bores of the first closure element against the exterior of the switching valve in the first switched state and a second covering element which closes the axial bores of the second closure element against the exterior of the switching valve in the second switched state.

In a further advantageous embodiment of the length-adjustable connecting rod, the accommodation comprises at least one circumferential groove in the area in which the inlet is arranged, which is in particular divided into two intake tubes configured to connect in fluid communication the first gap between the first closure element and the first anchor element and/or the second gap between the second closure element and the second anchor element to the inlet.

In a further advantageous embodiment of the length-adjustable connecting rod, a first passage, in particular an opening, is arranged between the first anchor and the first closure element which connects a first gap to the first switching connection, and wherein a second passage, in particular an opening, is arranged between the second anchor and the second closure element which connects the second gap to the second switching connection.

These and further features and advantages are apparent from the drawings in addition to the claims and the description, whereby the respective individual features can be realized individually or grouped together into subcombinations as an embodiment of the invention constituting, provided not expressly excluded, an advantageous implementation as well as one capable of protection.

The aforementioned features and advantages relative to the first aspect of the invention also apply accordingly to the second and third aspect of the invention.

Figure 4:
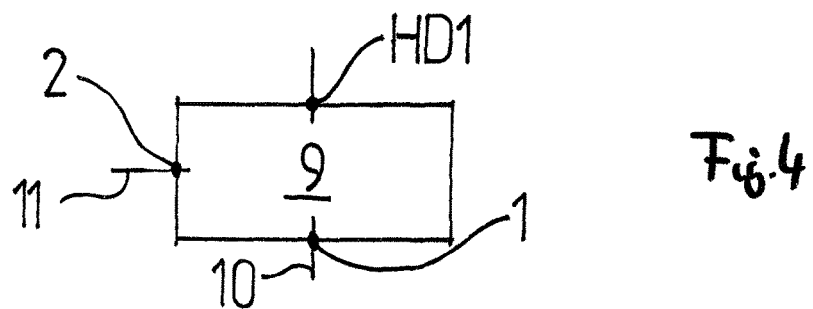
Figure 5:
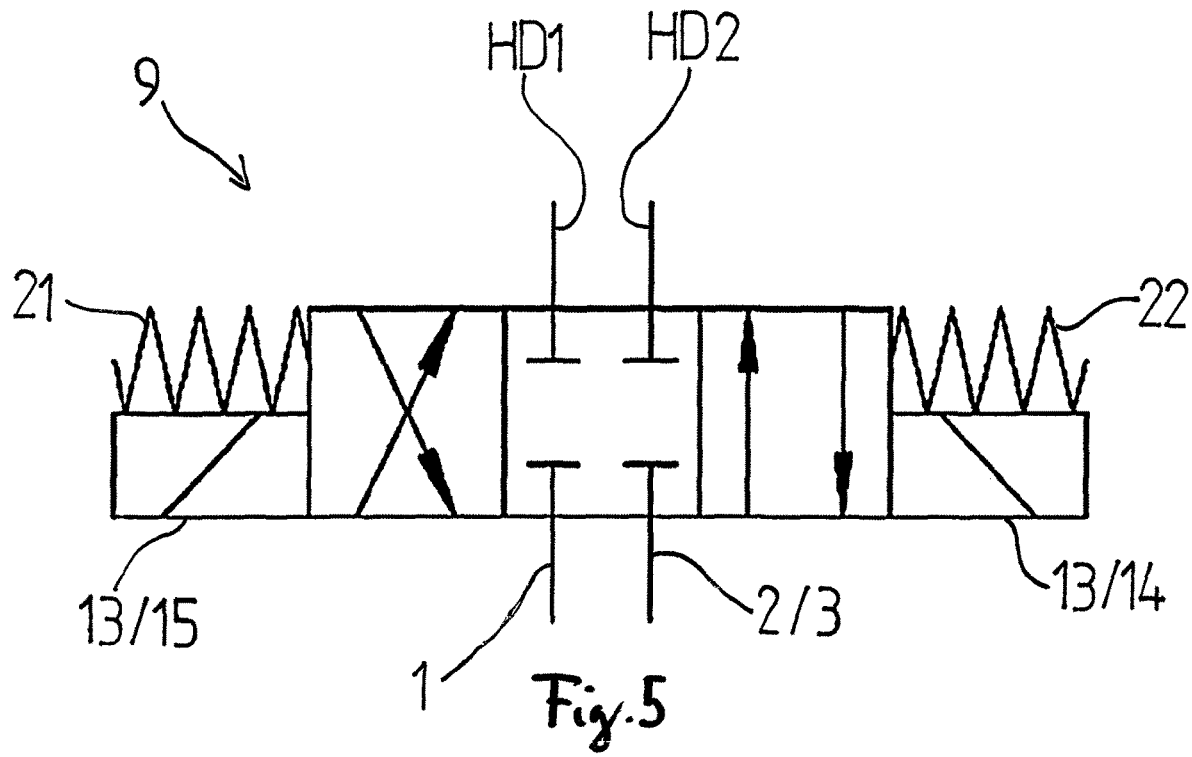
Figure 6:
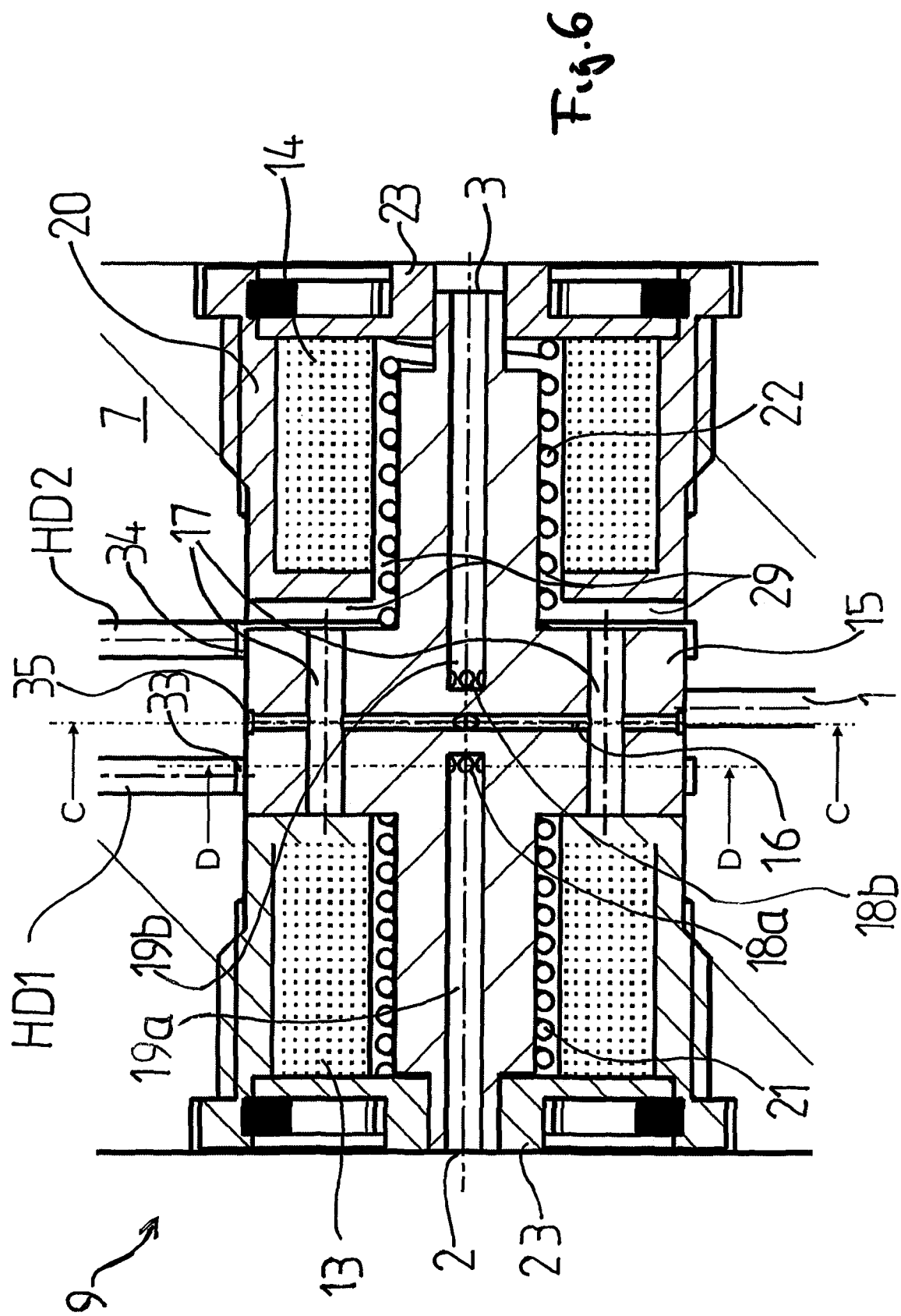
Figure 7:
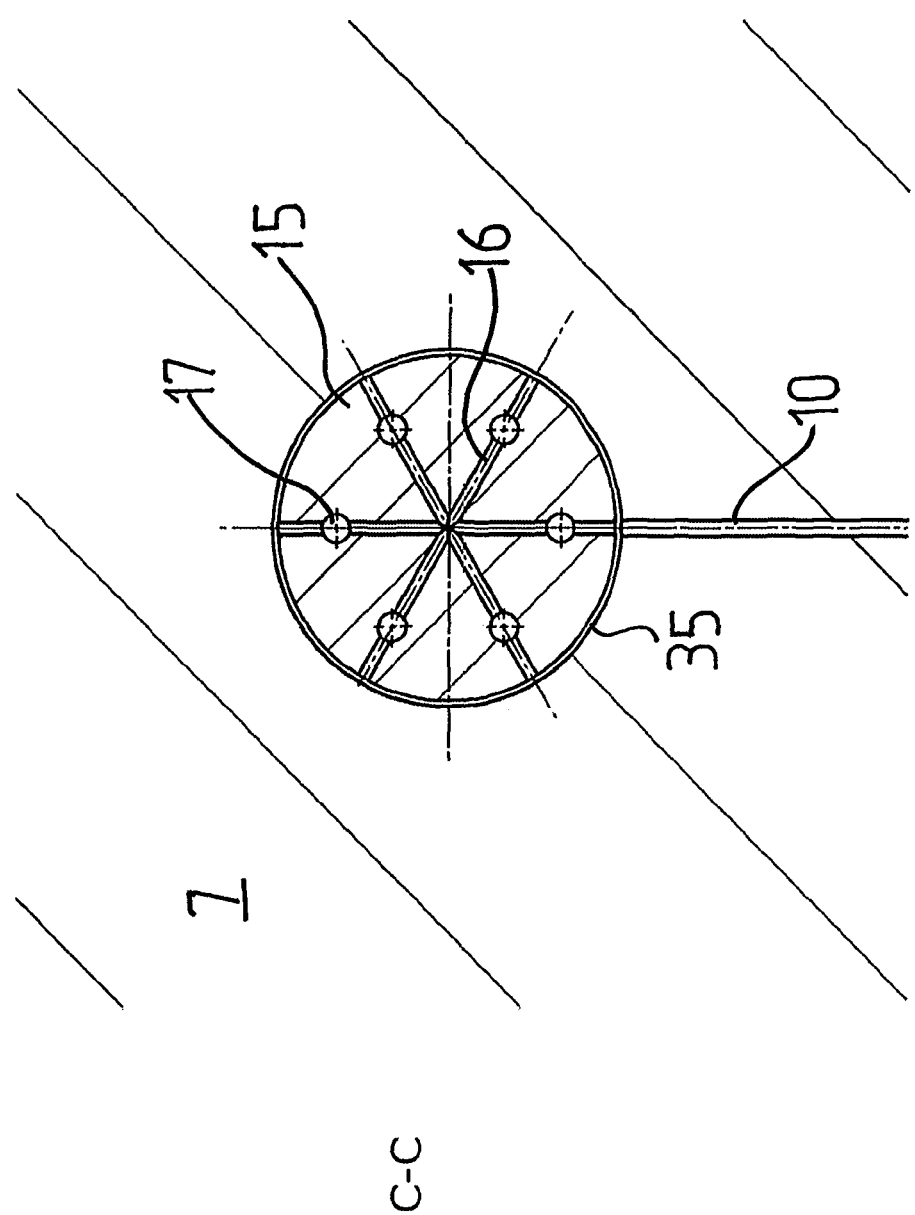
Figure 8:
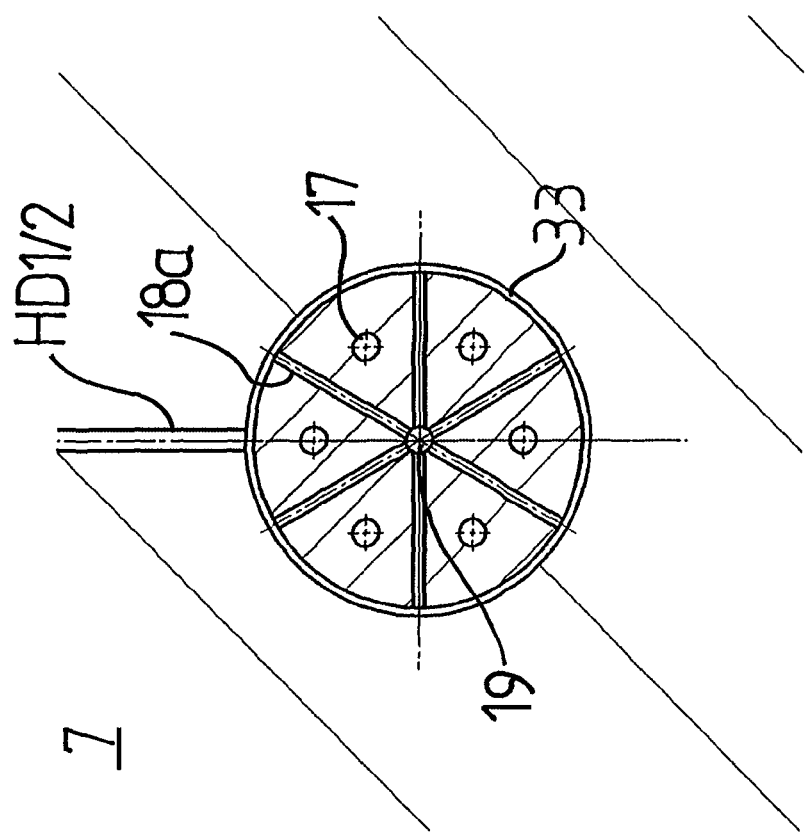
Figure 9:
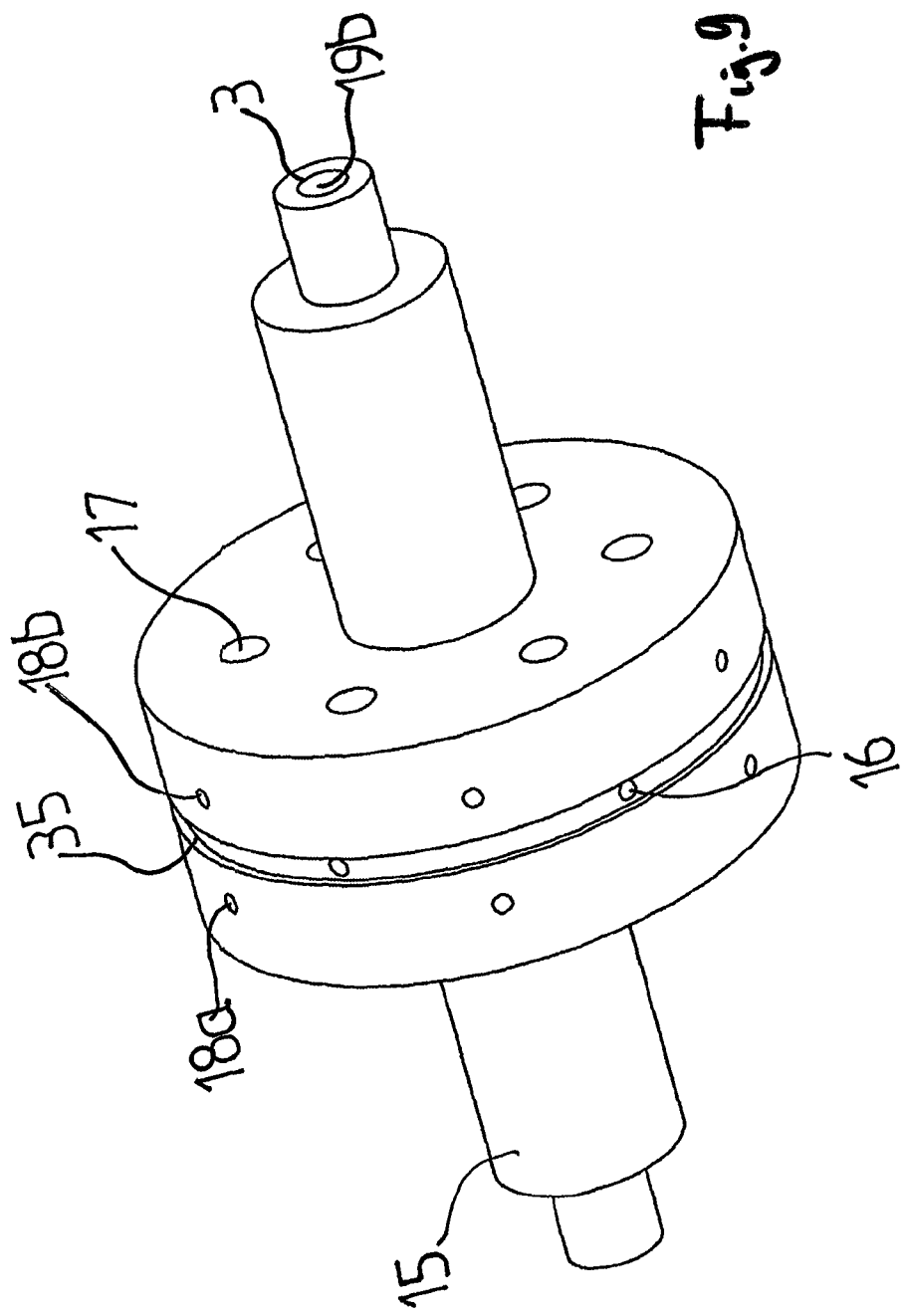
Figure 10:
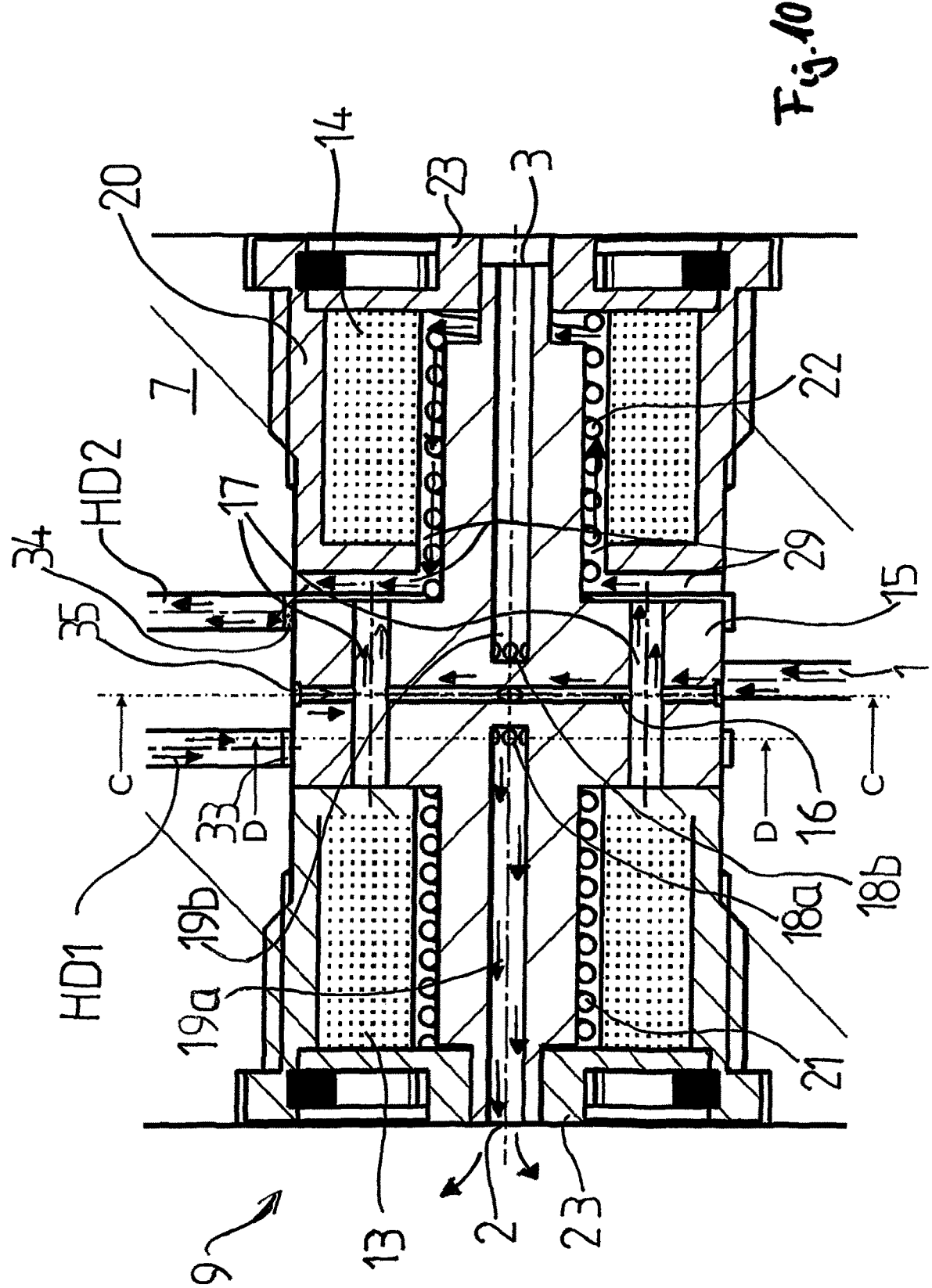
Figure 13:
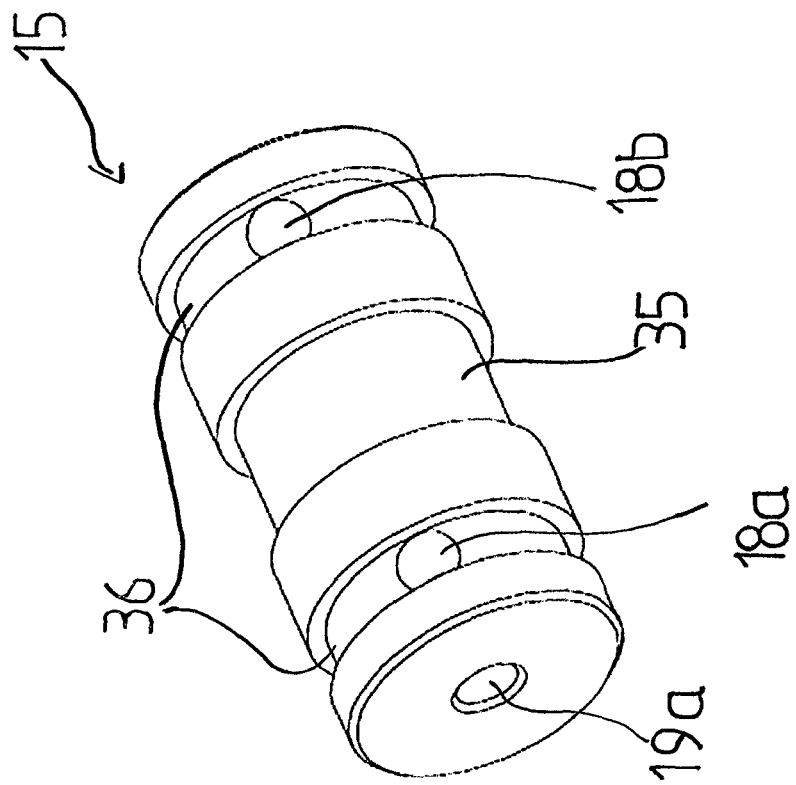
Figure 12:
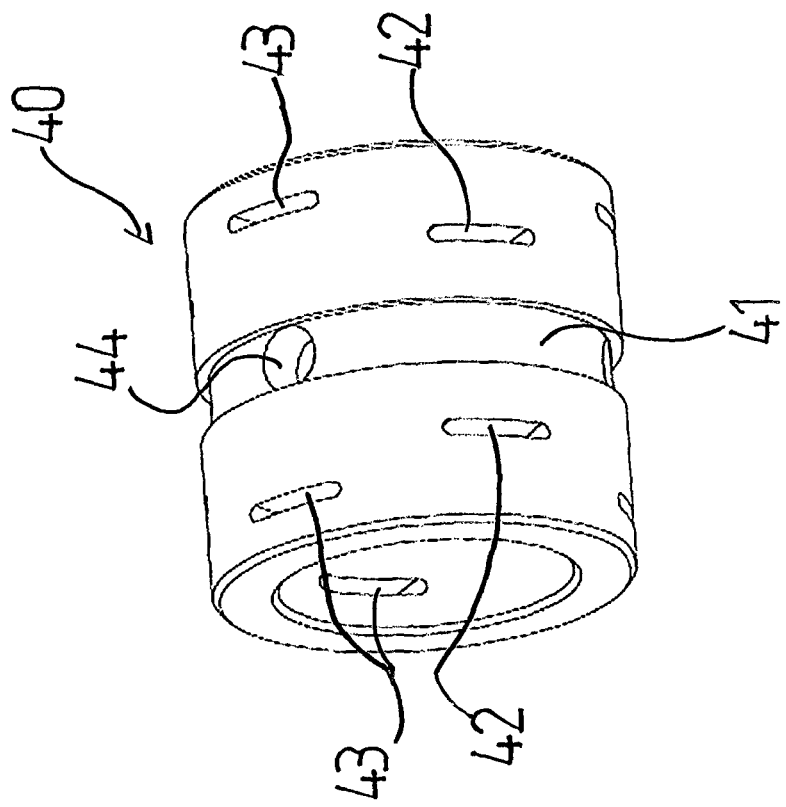
Figure 14:
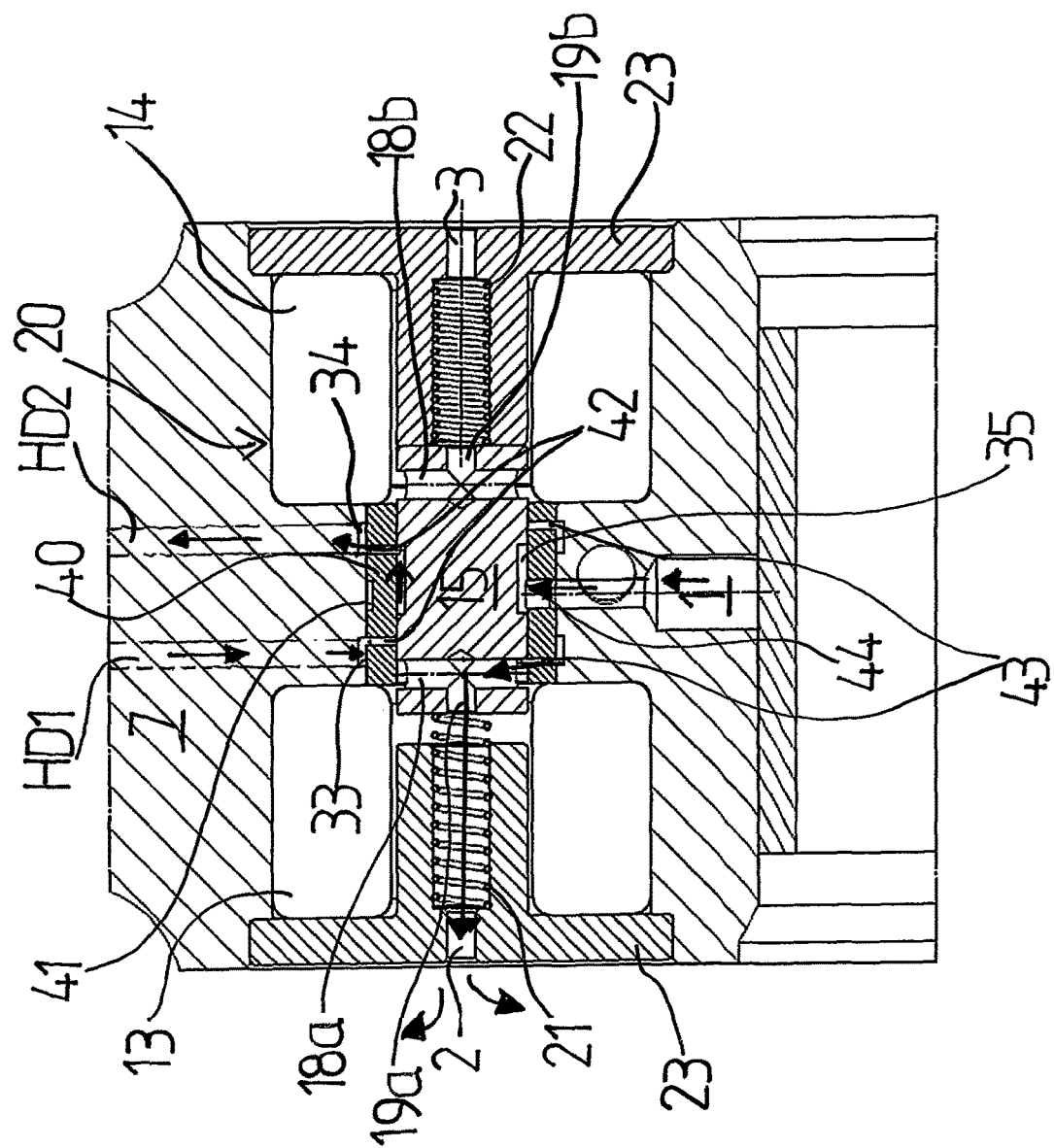
Figure 15:
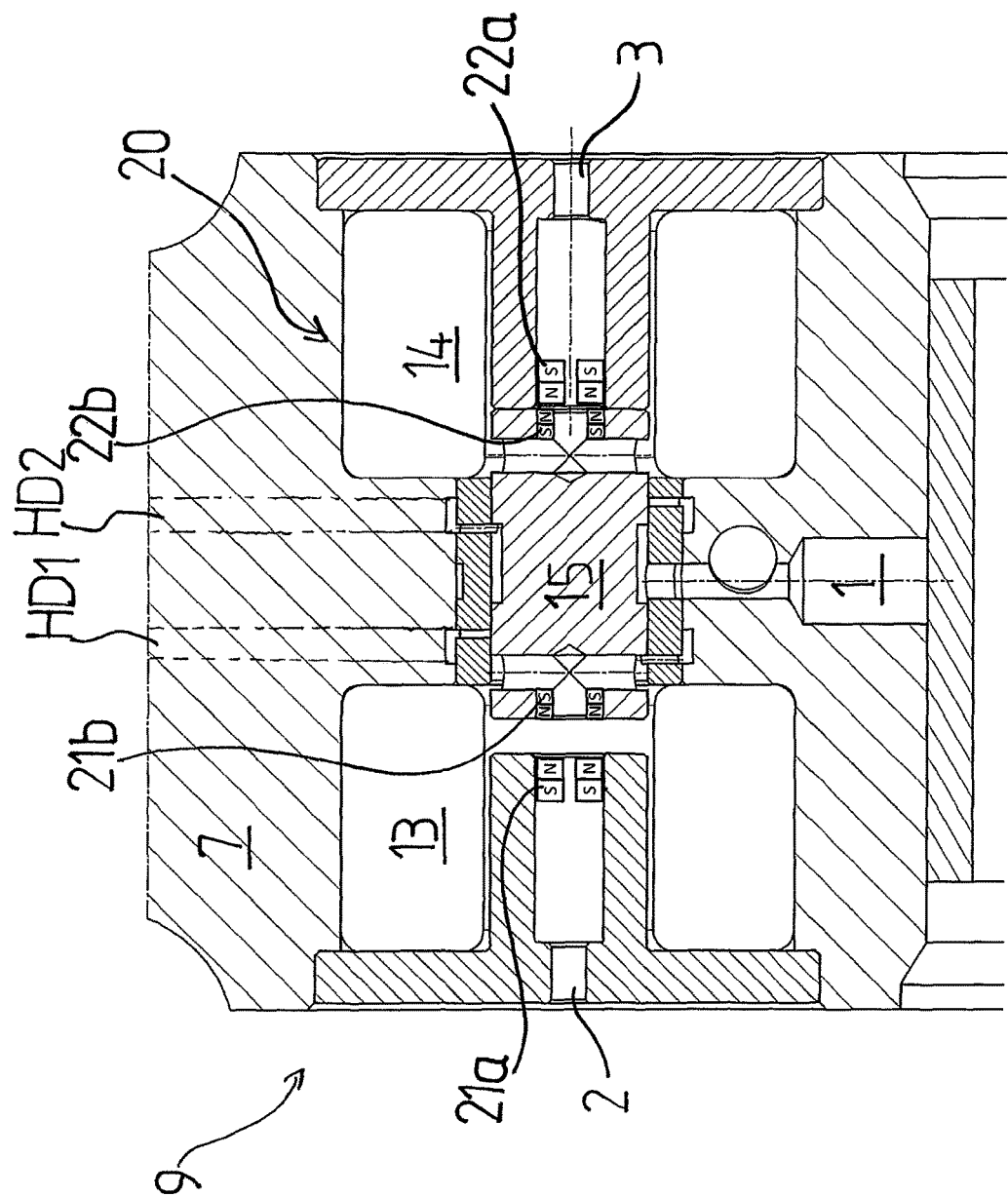
Figure 16:
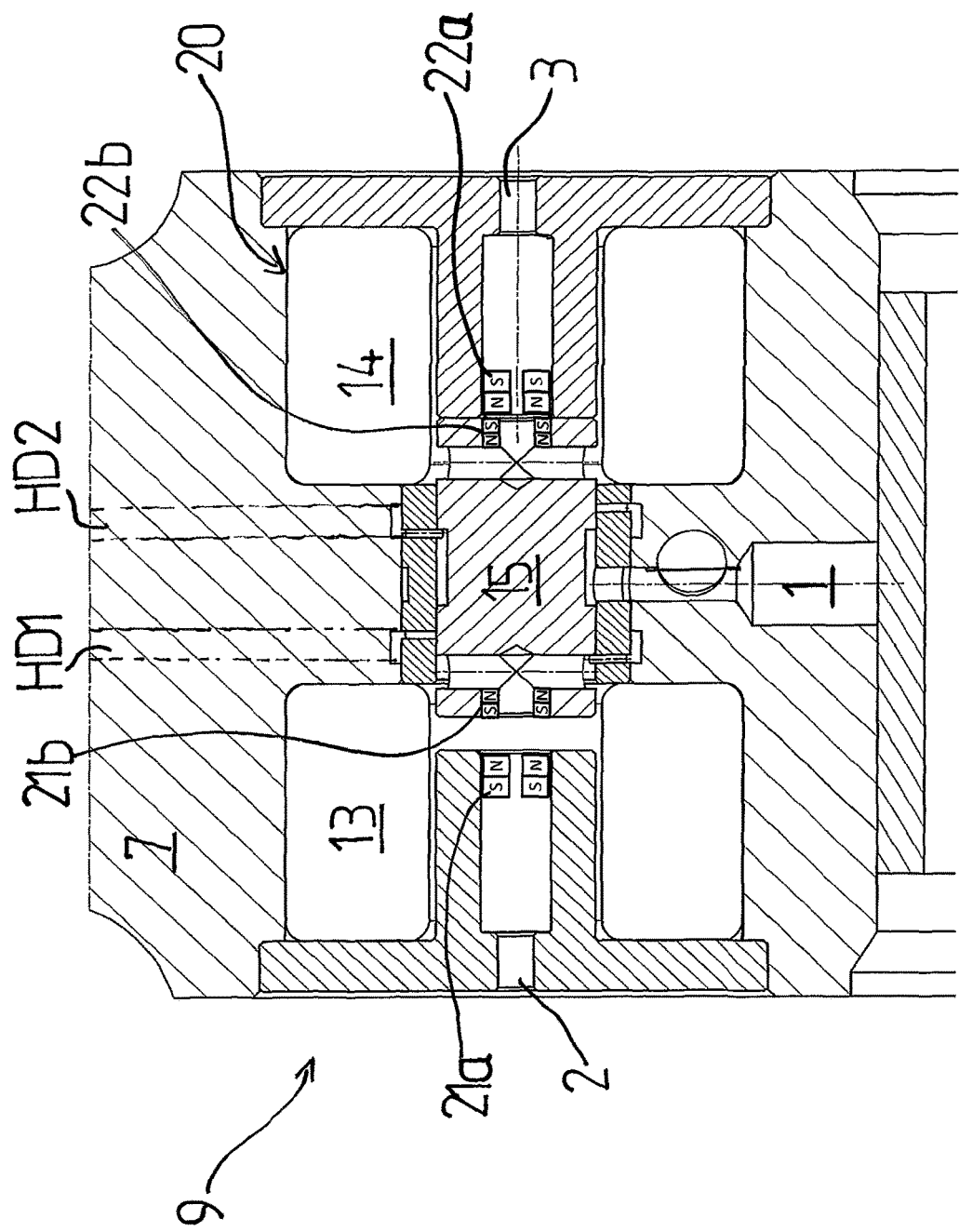
Figure 17:
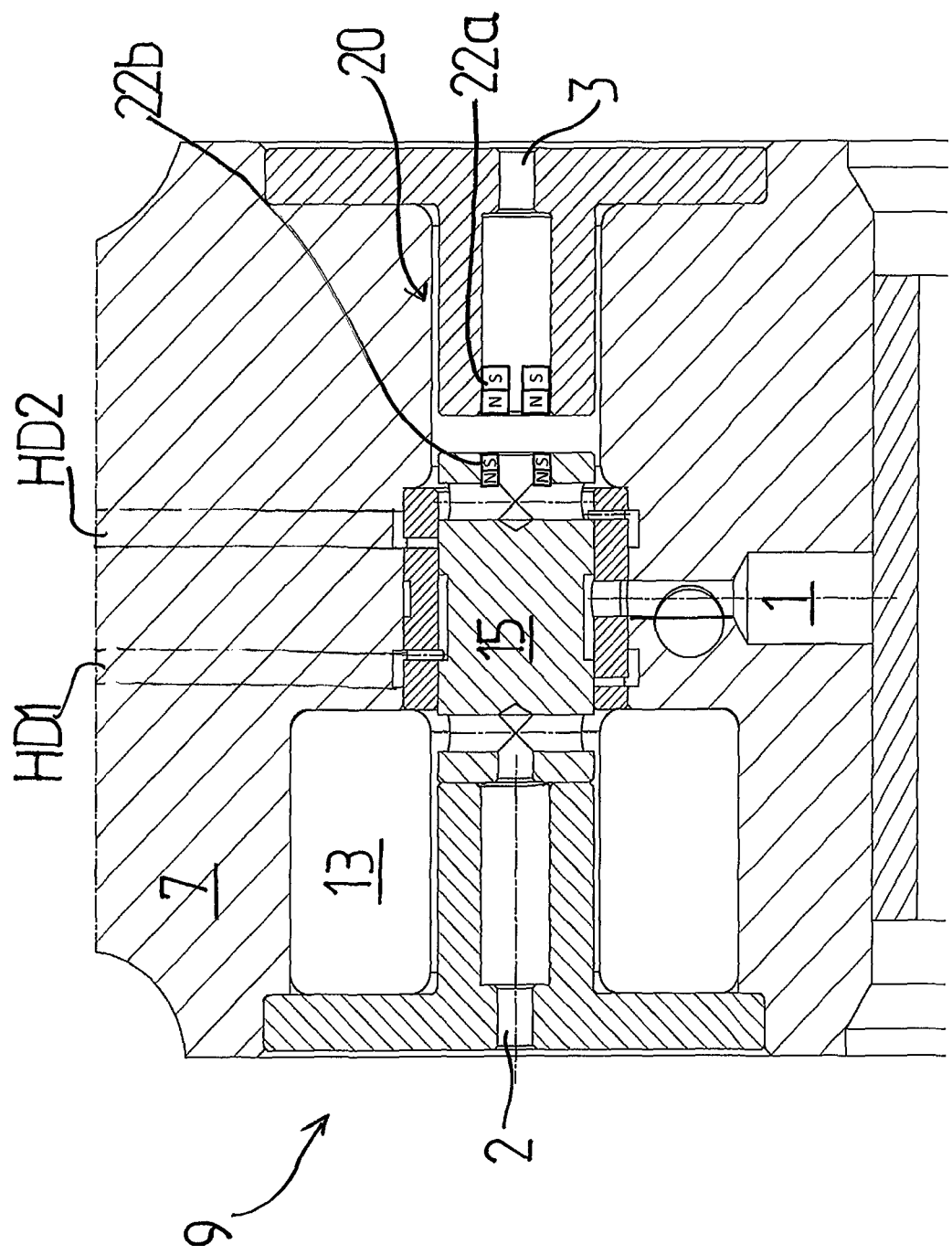
Figure 18:
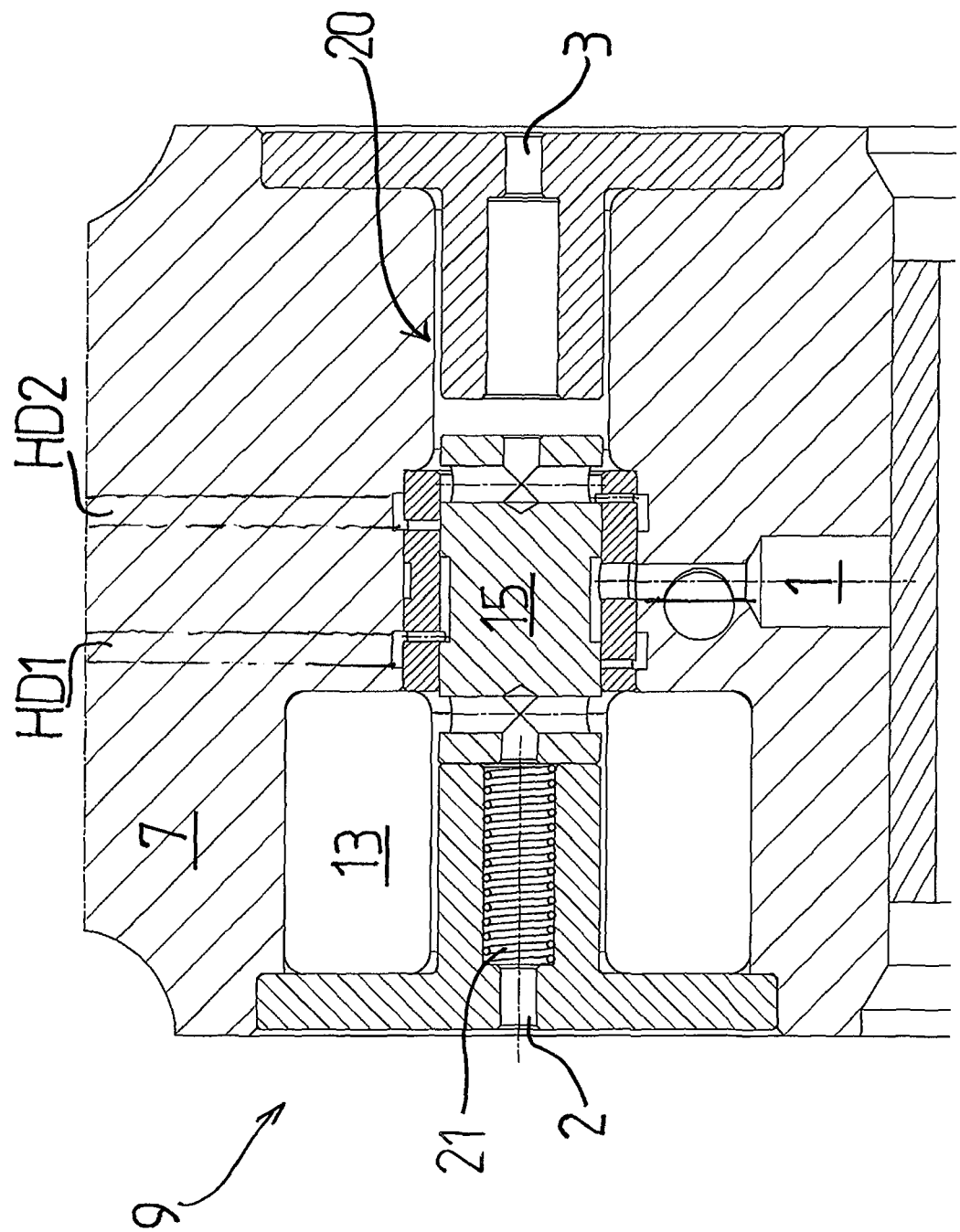
Figure 19:
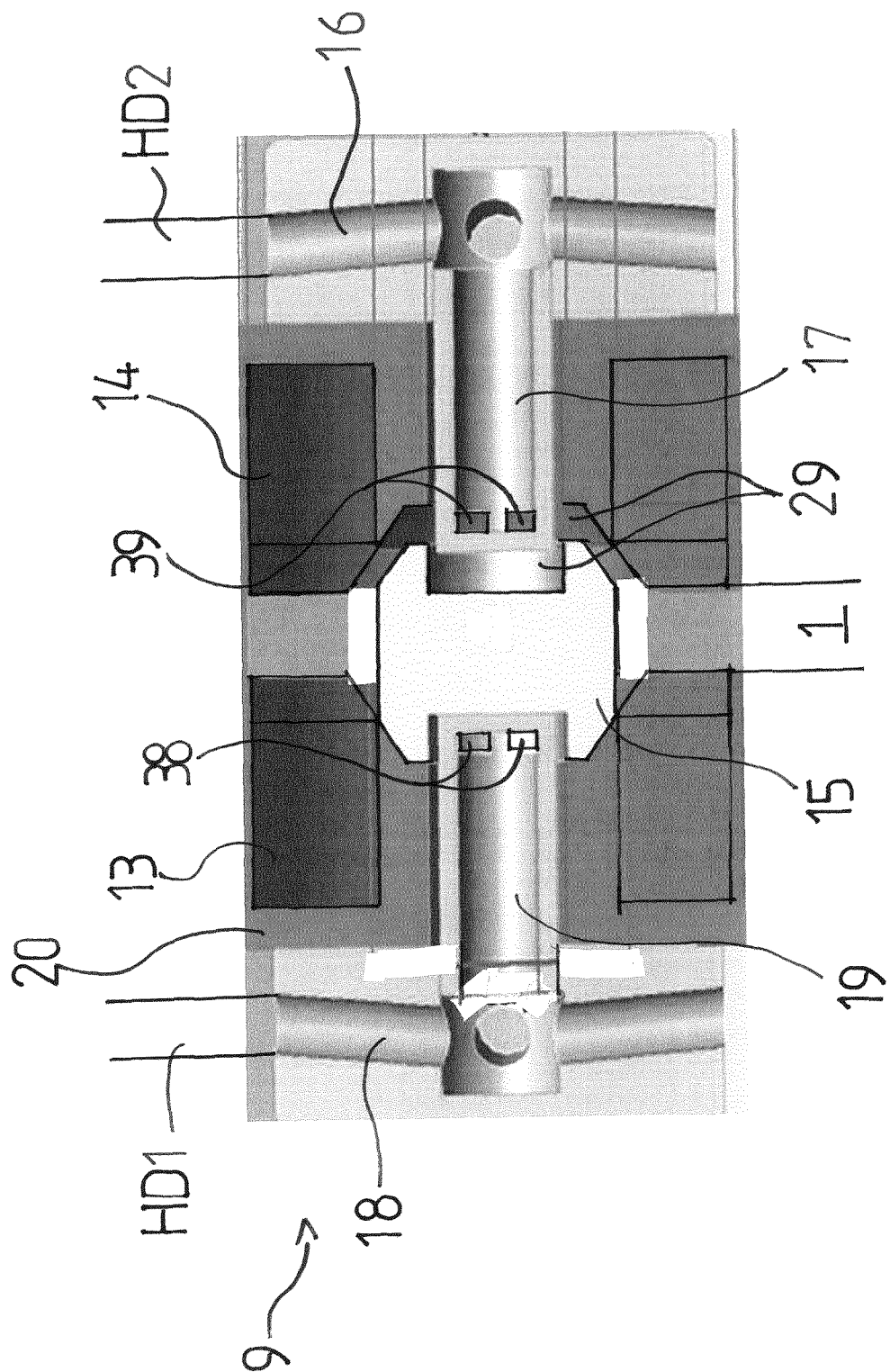
Figure 20:
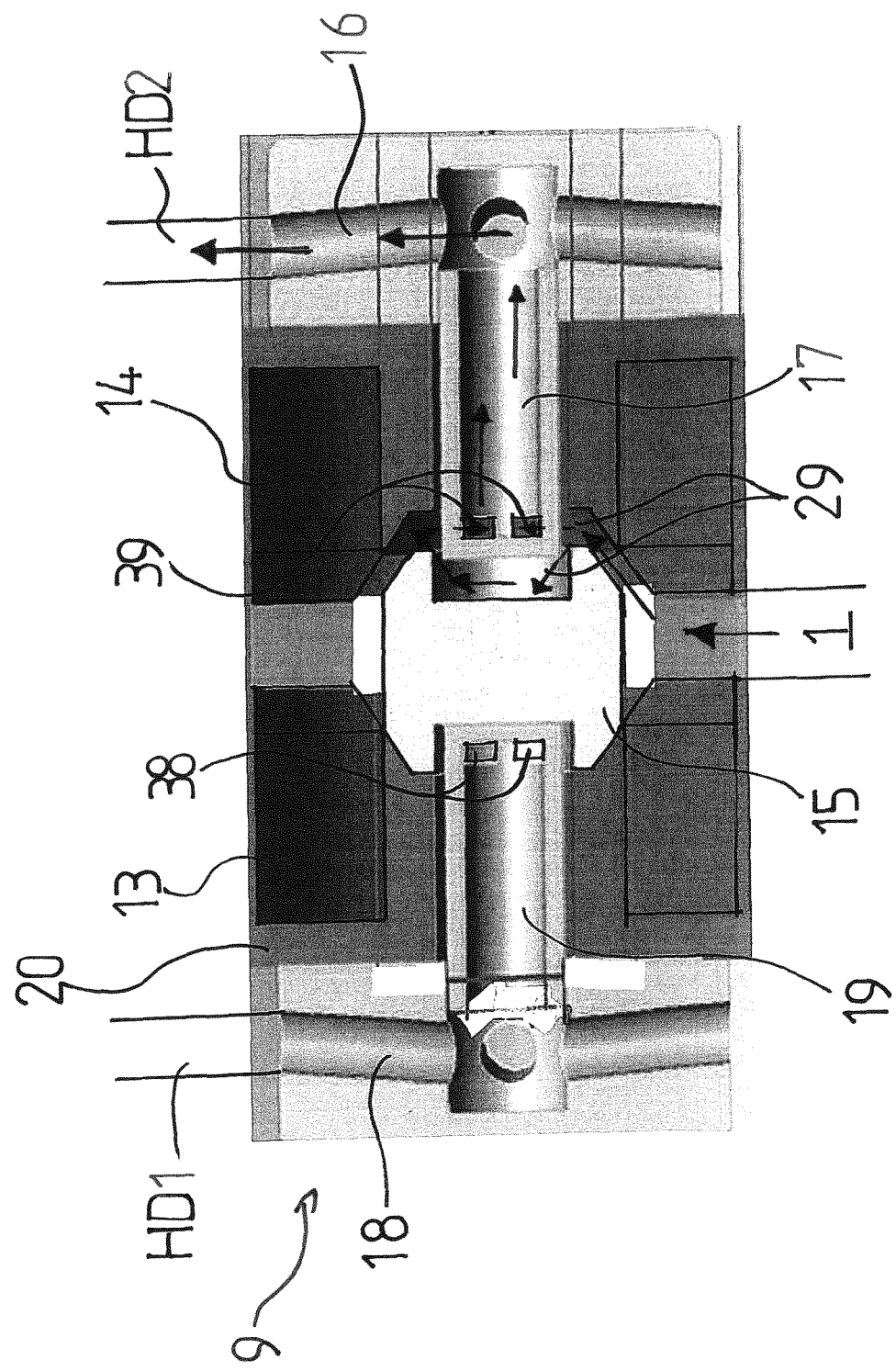
Figure 21:
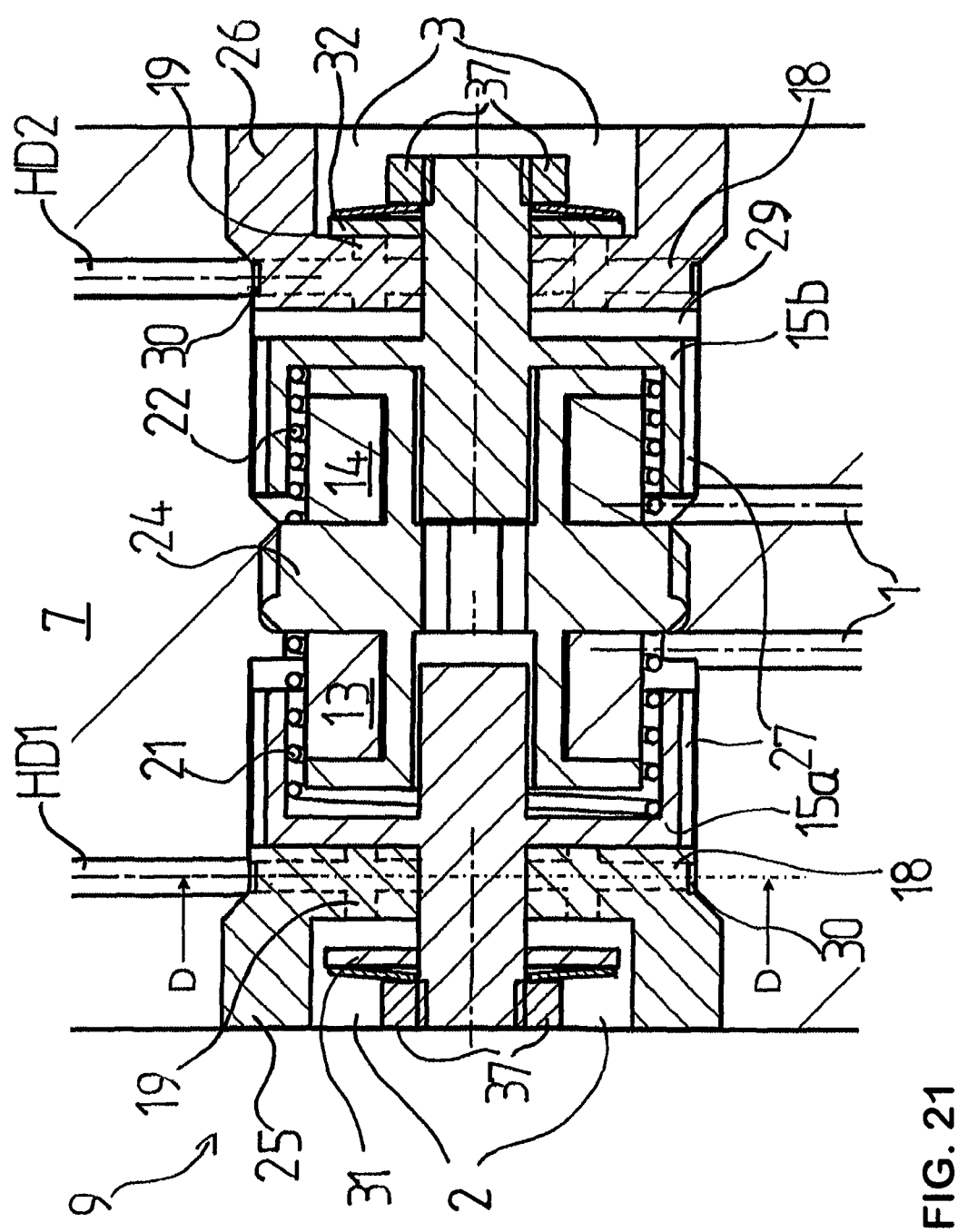
Figure 22:
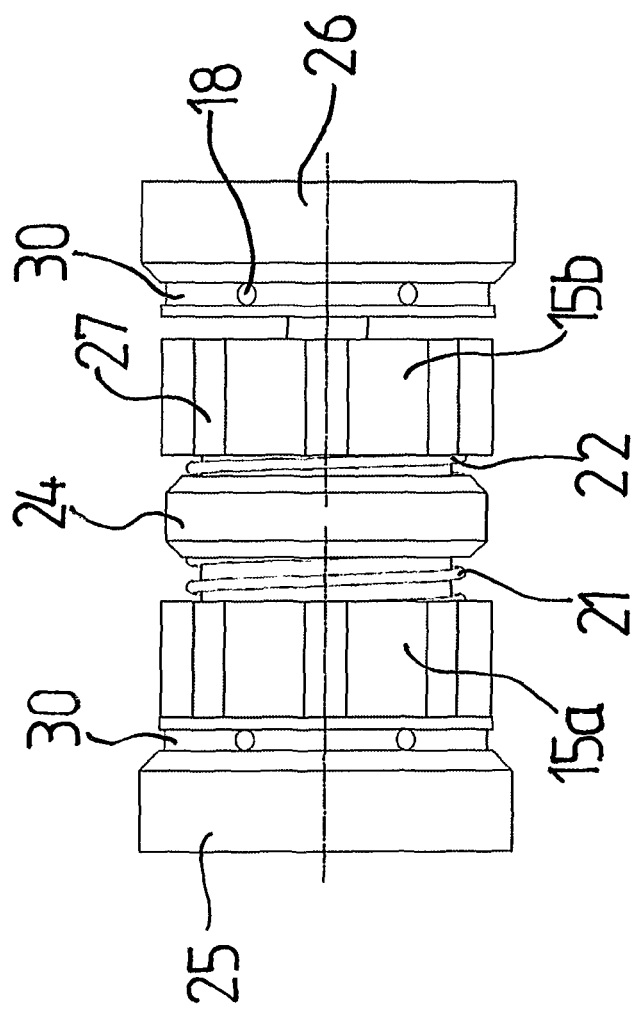
Figure 23:
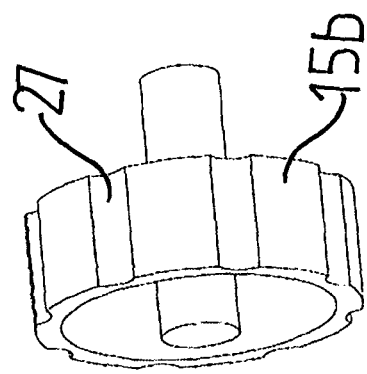
Figure 24:
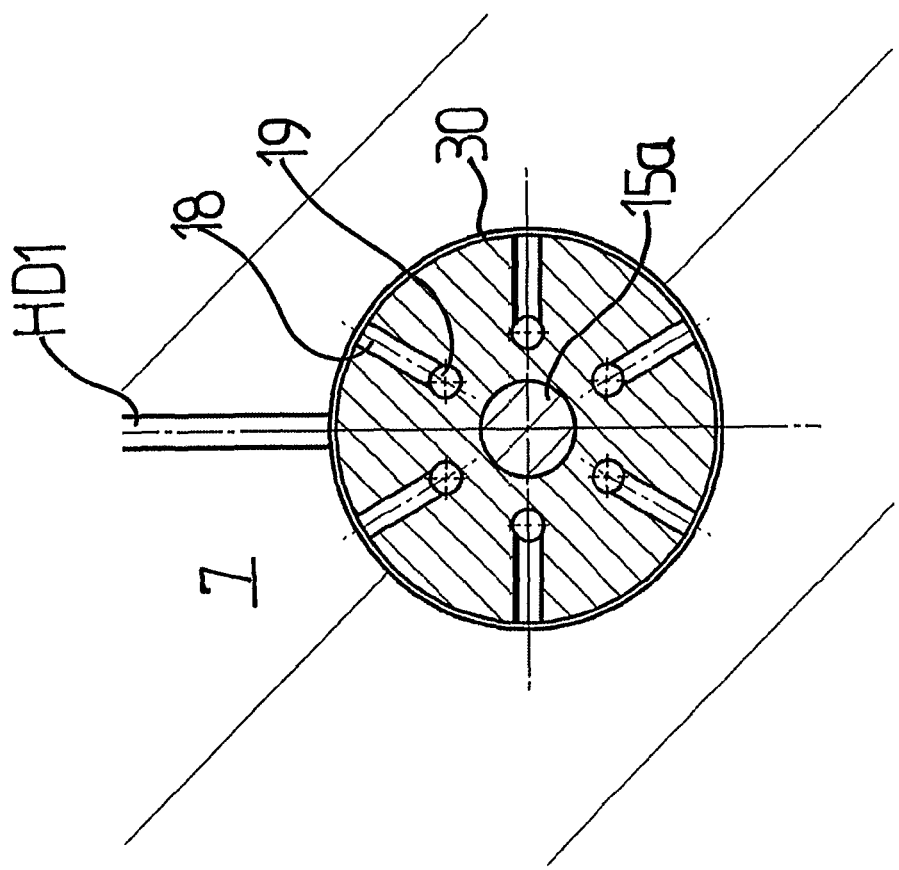
Figure 25:
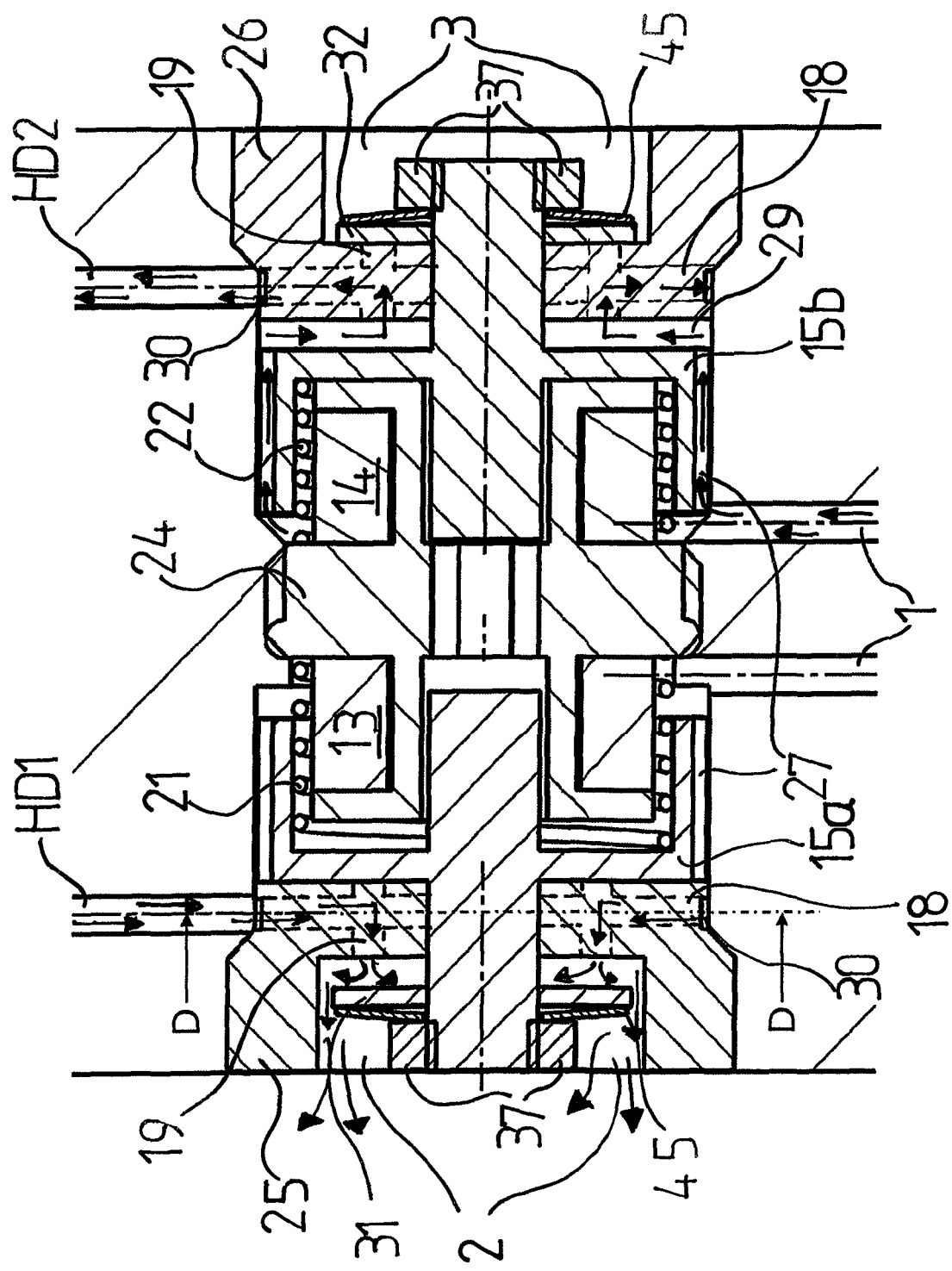
Figure 26:
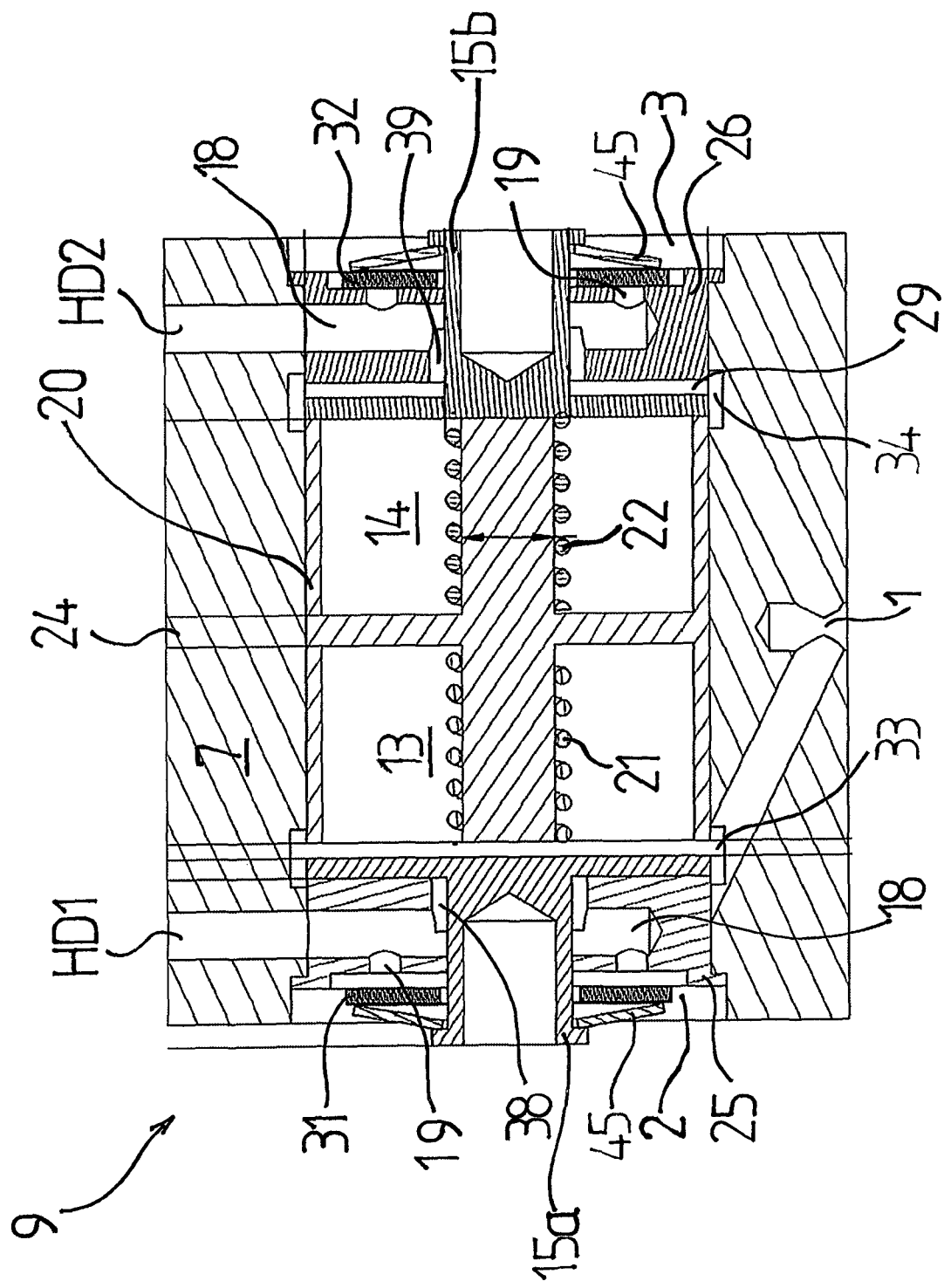
Figure 27:
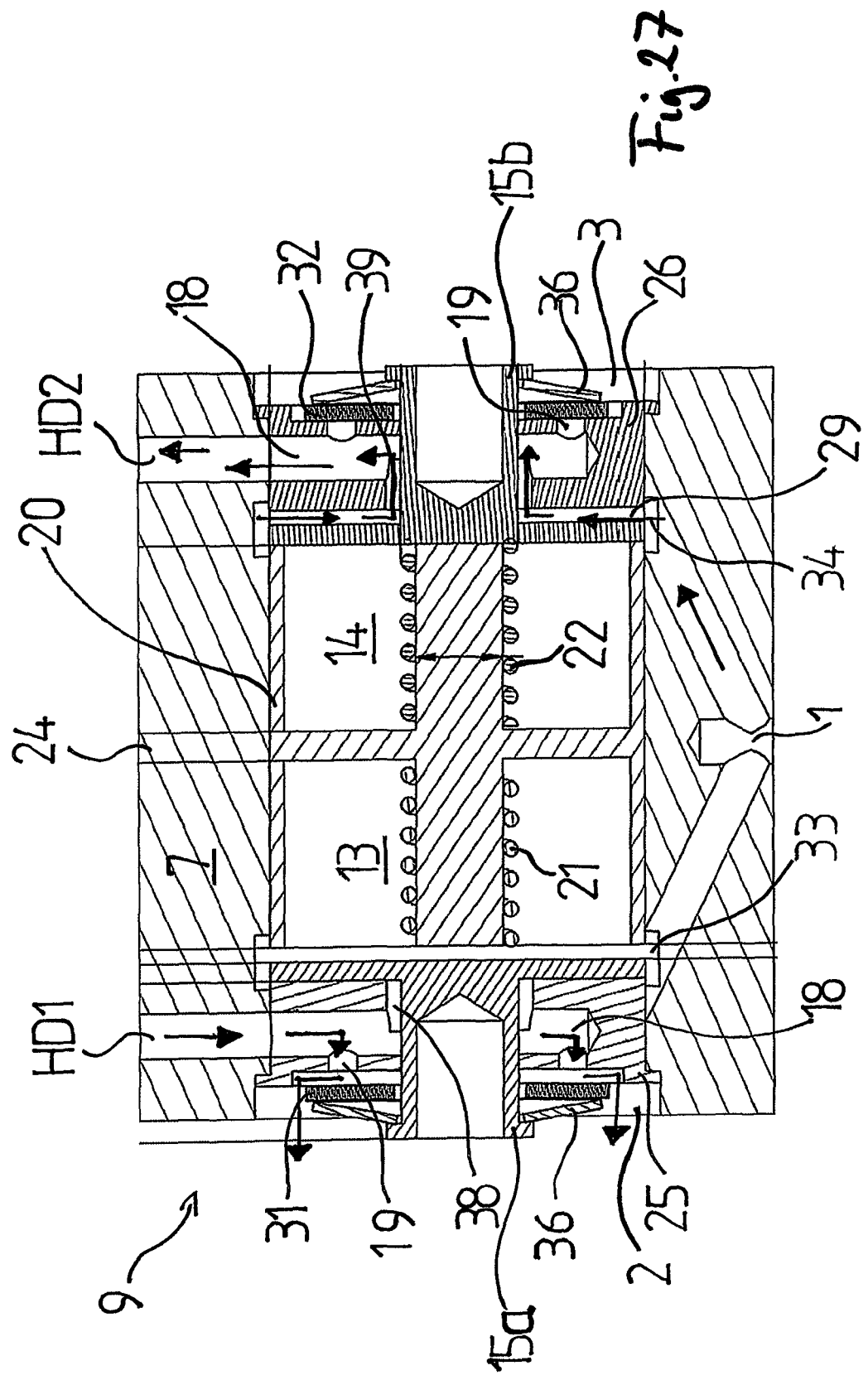

The invention will be described in greater detail in the following on the basis of non-limiting example embodiments as are at least partly depicted in the figures. Said example embodiments yield further features and advantages in conjunction with the corresponding figures. Shown at least partly schematically are:

FIG. 1 a top view of a first example embodiment of a connecting rod 7 according to the invention;

FIG. 2 a top view of a second example embodiment of a connecting rod 7 according to the invention;

FIG. 3 a representation of the connections of a first type of a switching valve according to the invention;

FIG. 4 a representation of the connections of a second type of a switching valve according to the invention;

FIG. 5 a switching symbol for an inventive switching valve of the type per FIG. 3;

FIG. 6 a representation of a first example embodiment of a switching valve according to the invention;

FIG. 7 a cross section along the C-C plane from FIG. 6;

FIG. 8 a cross section along the D-D plane from FIG. 6;

FIG. 9 a perspective top view of an anchor of the first example embodiment according to FIG. 6;

FIG. 10 a further depiction of the first example embodiment according to FIG. 6;

FIG. 11 a representation of a second example embodiment of the switching valve according to the invention;

FIG. 12 a perspective top view of a bushing of the second example embodiment according to FIG. 11;

FIG. 13 a perspective top view of an anchor element of the second example embodiment according to FIG. 11;

FIG. 14 a further representation of the second example embodiment according to FIG. 11, FIG. 15 an alternative configuration of the second example embodiment;

FIG. 16 a further alternative configuration of the second example embodiment;

FIG. 17 a representation of a third example embodiment of the switching valve according to the invention;

FIG. 18 an alternative configuration of the third example embodiment per FIG. 17;

FIG. 19 a representation of a fourth example embodiment of the switching valve according to the invention;

FIG. 20 a further depiction of the fourth example embodiment as per FIG. 19;

FIG. 21 a representation of a fifth example embodiment of a switching valve according to the invention;

FIG. 22 a top side view of the elements of the inventive switching valve of the fifth example embodiment according to FIG. 21 without an accommodation;

FIG. 23 a perspective top view of an anchor of the fifth example embodiment according to FIG. 21;

FIG. 24 a cross section of the D-D sectional plane of the fifth example embodiment according to FIG. 21;

FIG. 25 a further depiction of the fifth example embodiment according to FIG. 21;

FIG. 26 a representation of a sixth example embodiment of the inventive switching valve;

FIG. 27 a further depiction of the sixth example embodiment according to FIG. 26; and FIG. 28 a length-adjustable connecting rod according to an embodiment of the invention.

FIGS. 1 and 2 show two example embodiments of a length-adjustable connecting rod 7 according to the invention.

The connecting rod 7 comprises a first connecting rod section 7a and a second connecting rod section 7b which are preferably able to telescope into each other. In the case as depicted, the first connecting rod section 7a, which is fixedly connected to the large connecting rod eye, receives the second connecting rod section 7b which is fixedly connected to the small connecting rod eye.

The lengthwise adjustment of the connecting rod 7 can thereby ensue hydraulically, for example by means of a hydraulic cylinder comprising a piston, or mechanically, for example by means of a threaded gear comprising a nut section and a spindle element section.

A hydraulic system is described for example in the WO 2015/055582 A2 cited at the outset. This document relates to a length-adjustable connecting rod for a reciprocating piston engine, in particular for an internal combustion engine, comprising at least one first rod part having a small connecting rod eye and a second rod part having a large connecting rod eye, the two rod parts being able to move telescopically toward and/or into each other, wherein the second rod part forms a guiding cylinder and the first rod part forms a piston element able to be longitudinally displaced in the guiding cylinder, wherein a first high-pressure chamber is spanned between the second rod part and the piston element on the side of the piston element facing the large connecting rod eye into which at least one first oil channel flows, in which in particular a first check valve opening in the direction of the first high-pressure chamber is arranged, wherein at least one first return channel leads out from the first high-pressure chamber, the outflow cross-section of which can be blocked by a control valve in a first position and unblocked by the control valve in a second position, wherein the control valve preferably comprises a control piston able to be axially displaced into a receiving bore of the second rod part of the connecting rod which in particular can be moved into the first position by means of a return spring and into the second position against the force of the return spring by means of an actuating force, wherein the piston element is designed as a piston operative at both ends, preferably as a differential piston.

A system which uses a screw drive or rotating spindle respectively is known for example from application A 50725/2015. Described therein is a length-adjustable connecting rod for a reciprocating piston engine, in particular for an internal combustion engine, which has at least one first rod part and one second rod part, with both rod parts being able to be moved relative to each other in the direction of the longitudinal axis of the connecting rod by means of a screw gear, wherein the screw gear comprises at least one first gear part and one second gear part engaged with the first gear part, wherein the first gear part is designed as a spindle nut or threaded spindle respectively and the second gear part as a threaded spindle or spindle nut respectively, wherein the screw drive is not of self-locking design, wherein a first gear part preferably rotatably mounted in the first rod part is connected to at least one rotary locking device able to be switched by means of at least one switching device which prevents the first gear part from rotating in at least one direction of rotation at least in one first position and allows it at least in one second position.

The content of application WO 2015/055582 A2 and application A 50725/2015 is also expressly made subject matter of the present application by reference. In particular, hydraulic or mechanical implementations for adjusting the length of the connecting rod 7 can be configured as described in these two printed publications.

Irrespective of whether the length adjustment is effected by a hydraulic piston or another device, the respective device can be hydraulically controlled according to the invention. The hydraulic device 8 shown in FIGS. 1 and 2 can hereby comprise the length adjustment device or can form same, as in the case of a hydraulic piston, or, as in the case of a screw thread, control or actuate the length adjustment device.

Preferably, the hydraulic device 8 further comprises, as shown in FIG. 2, an actuating valve 12. Such an actuating valve, which in particular can be designed as a slide valve or rotary slide valve, is in particular described in the applicant's PCT/EP2016/064193. Same relates to a length-adjustable connecting rod, or a length-adjustable connection rod for a reciprocating piston engine respectively, having at least one first rod part and one second rod part, whereby the two rod parts are in particular telescopically movable in the direction of a longitudinal axis of the connecting rod toward and/or into each other by means of a length adjustment apparatus, wherein the length adjustment apparatus can be fed a hydraulic medium via at least one hydraulic channel and wherein the at least one hydraulic channel can be fluidically connected to at least one hydraulic medium supply channel by a control device, wherein the control device comprises a first valve and a second valve, each with a valve body arranged in a valve chamber, wherein the valve bodies can in each case be pressed against a valve seat by a restoring force, wherein a first valve chamber of the first valve is fluidically connected to a first hydraulic channel and a second valve chamber of the second valve is fluidically connected to a second hydraulic channel and the valve bodies are operatively connected by a connecting device able to move at least between a first position and a second position, wherein in the first position of the connecting device the first valve body and in the second position of the connecting device the second valve body can respectively raise from the associated first/second valve seat by way of the connecting device and the respective first/second valve chamber can be fluidically connected to the hydraulic medium supply channel, and in the respective other position of the connecting device, the first valve body seats on the first valve seat, or the second valve body seats on the second valve seat respectively, and blocks the fluidic connection to the hydraulic medium supply channel.

The content of said application PCT/EP2016/064193 is also expressly made subject matter of the present application by reference. In particular, the implementation of the length adjustment apparatus as well as the control device, the hydraulic and/or mechanical connecting of the control device and the length adjustment apparatus as well as the arrangement and alignment of the control device can be inventively realized as in the cited PCT/EP 2016/064193.

Common to the two example embodiments of FIGS. 1 and 2 is both having a switching valve 9 for controlling the inflow and outflow of a hydraulic medium into or out of the hydraulic device 8.

The hydraulic medium supply line, as FIGS. 1 and 2 show, is preferably supplied with a pressurized hydraulic medium, in particular oil or pressurized oil, from the large connecting rod eye or the main bearing of the connecting rod 7 respectively. In particular, the hydraulic medium is thereby lubricating oil supplied to the main bearing.

Preferably, as FIG. 3 shows, the switching valve 9 comprises five connections. An inlet for hydraulic medium, which is preferably connected to a hydraulic medium supply line 10, a first outlet 2, which is preferably connected to a drainage 11, a second outlet 3, which is preferably likewise connected to a drainage 11, and a first switching connection HD1 as well as a second switching connection HD2 connected to the hydraulic device 8 and/or the closing valve 12.

Preferably, the switching connections HD1, HD2 are each connected to a pressure chamber of a hydraulic cylinder of the hydraulic device 8 if the length adjustment device is of hydraulic design. In this case, said two pressure chambers can be filled with or drained, i.e. emptied, of hydraulic medium by respectively connecting to a hydraulic medium supply line 10 or to a drainage 11.

The second example embodiment of FIG. 2 differs from the first example embodiment of FIG. 1 in particular by an actuating valve, particularly a slide valve or a rotary slide valve, being additionally connected between the switching valve 9 and the hydraulic device 8. If one is further provided as such, it preferably comprises a control piston or valve body respectively which divides a hydraulic cylinder into a first chamber and a second chamber. In this case, the switching connections HD1, HD2 are in each case connected to one of said chambers so that a displacing of the control piston or valve body is effected in one switched state by hydraulic medium being supplied to one chamber and the other chamber being drained. The movement of the control piston or valve body of the actuating valve 12 opens or closes switching connections of the actuating valve 12 by means of which, given a hydraulic device for adjusting the length of the connection rod 8, the respective one of the pressure chambers can be filled and/or drained.

The system shown in FIGS. 1 and 2 for adjusting the length of the connecting rod 7 is applicable both to systems in which the lengthwise adjustment is a passive operation; i.e. in which external forces acting on the connecting rod 7 are used to effect the length adjustment, as well as systems in which the length of the connecting rod 7 is actively adjusted; i.e. in which the hydraulic device 8 or the length adjustment device generates a force to move the first connecting rod section 7a and the second connecting rod section 7b alongside each other.

A schematic diagram of a switching valve 9 from FIG. 3 is shown in FIG. 5. The valve with inlet 1 or drainage 2, 3 and switching connections HD1, HD2 is held in a defined position by means of the restoring device 21, 22 and actuated by actuating devices respectively formed by the first coil 13 and anchor element 15 and the second coil 14 and anchor element 15. Preferably, the switching valve 9 has two switched states and is therefore bistable. Alternatively thereto, the switching valve 9 preferably has three switched states, whereby in this case, the switching connections HD1, HD2 are preferably neither drained nor connected to the inflow 11 in one switched state and therefore form a neutral switching position.

As indicated in FIGS. 1 and 2, drainages 11 lead out from the connecting rod 7 so that the oil can escape into an oil sump of a reciprocating piston engine. Alternatively, it can also be provided for the oil to be discharged from the pressure chambers of the hydraulic device 8 or the chambers of the actuating valve 12 via the hydraulic medium supply line 10. In particular, it can also be provided for the switching valve 9 to only comprise a single outlet 2 and both switching connections HD1, HD2 to be drained via said outlet 2.

In one alternative embodiment, which is shown in FIG. 4, the switching valve 9 comprises only one switching connection HD1 and only one outlet 2. This implementation of an example of a switching valve is in particular employed if the hydraulic device 8 or the actuating valve 12 only has one pressure chamber or one chamber respectively and/or is exclusively actuated by means of a pressure chamber or chamber.

Moreover, it can be provided with respect to all the example embodiments of the switching valve 9 for inlet 1, for example, to be divided into two connections. The same applies to the other connections such as, for example, switching connections HD1, HD2 and outlets 2, 3.

FIG. 6 shows a first specific example embodiment of an electromagnetically actuatable switching valve 9 having a total of five connections as per FIGS. 3 and 5.

An anchor 15, which preferably comprises or consists of magnetizable or ferromagnetic material, substantially exhibits the cross section of a cross having a center section comprising radial holes 16, 18 and axial holes 17, 19 and narrower leftward-extending sections arranged in an accommodation 20 within two electromagnetic coils 13, 14. The indication of radial and axial in this context refers to a center axis of the switching element 12. The accommodation 20 preferably surrounds the arrangement of the switching valve 9 elements in the area of the coils 13, 14. In particular, the accommodation 20 covers the switching valve 9 with the cover elements 23 left and right to the connecting rod 7, or depending on the arrangement of the switching valve 9 respectively, to beyond the connecting rod 7 to the interior of the reciprocating piston engine. A respective first restoring device, in the present example embodiment a spring and a second restoring device 22, in the present case likewise a spring, is in each case preferably supported on these cover elements 23 and hold the anchor 15 axially displaceable toward the coils 21, 22 in a position defined by the spring force and the compression of the springs 21, 22.

If the first coil 13 is activated or respectively energized and the second coil 14 deactivated, a magnetic field forms between the first coil 13 and the anchor 15 which causes the anchor 15 to be pulled to the right toward the first coil 13 by electromagnetic force, wherein the electromagnetic force overcomes the return force of the spring 21. Correspondingly, the anchor 15 moves left to a second switching position when the second coil 14 is activated and the first coil 13 deactivated.

The switching valve 9 can be switched both with alternating voltage (AC) as well as with direct current (DC). In principle, a direct current supply to the first coil 13 or the second coil 14 would hereby be advantageous as it would ensure a permanent power supply and thus electromagnetic power delivery. However, supplying the connecting rod 7 with alternating voltage is easier to realize. Although the anchor element 15, formed in this first example embodiment by a single anchor, hereby oscillates slightly due to the electromagnetic forces not being consistent but varying with the frequency of the alternating current, the desired switching position is substantially maintained during an entire alternating current cycle due to the bearing by the first spring 21 and the second spring 22 as well as, in any case in this first example embodiment, the dampening of the hydraulic medium in a first gap 28 or in a second gap 29 between the anchor 15 and the accommodation 20.

If the springs 21, 22 are set such that the neutral position corresponds to a central position of the anchor 15 in the accommodation 20, then neither the hydraulic medium supply line nor the hydraulic medium drainage are connected to switching connections HD1, HD2. This corresponds to a neutral switching position in which no unwanted length adjustment can occur by actuation of the hydraulic device 8.

Since the alternating voltage is preferably produced by an inductance loop between the connecting rod 7 and the housing of the reciprocating piston engine, the frequency depends on the rotational speed of the crankshaft to which the connecting rod 7 is secured by way of the main bearing. At higher crankshaft rotational speeds, the duration of the phases over which no voltage is applied during one cycle decreases so that the anchor 15 remains in the respective switching position due to its mass inertia even if the electromagnetic forces are temporarily interrupted or weakened during a cycle.

The anchor 15 comprises radial feed holes which are connected to axial feed holes 17 in fluid communication. Moreover, the anchor 15 comprises radial drainage holes which are connected to axial drainage holes 19a, 19b in fluid communication.

Axial drainage hole 19a terminates at the first outlet 2, axial drainage hole 19b at the second outlet 3. Depending on the switching position of the anchor 15, to the right or respectively second, or to the left or respectively first, radial drainage holes 18 are fluidically connected to the first switching connection HD1 or radial drainage holes 18b are fluidically connected to the second switching connection HD2.

In the right or respectively second switching position of the anchor 15 shown in FIGS. 6 and 7, a second gap 29 is formed between the anchor 15 and the left side of the accommodation 20 which creates a fluidic connection between the axial feed holes 17 and a second circumferential groove 34 of the accommodation 20 formed within this region by the connecting rod 7. The second switching connection HD2 in turn leads into the second circumferential groove 34.

Accordingly, a first gap 28 is formed between the first coil 13 or accommodation 20 respectively and the anchor 15 (not shown) in the first switching position of the first example embodiment shown in FIG. 6. Here, the axial feed holes 17 are connected in fluid communication to the first switching connection HD1 via the first gap 28 and the first circumferential groove 33.

FIG. 7 shows a cross section along the C-C plane through the anchor 15 according to FIG. 6. FIG. 8 shows a cross section of the anchor element along the D-D sectional plane in FIG. 6.

FIG. 9 shows the anchor element 15 according to FIG. 6 in a perspective view. Clearly visible is the circumferential groove 35 of the anchor which connects the radial feed holes 16 together on the exterior of the anchor element 15 and ensures that, regardless of the angular position around the anchor element 15 axis, a fluidic connection between the radial feed holes 16 and the inlet 1 can always be ensured; i.e. even if none of the feed holes 16 are aligned with the inlet 1.

Correspondingly, the first circumferential groove 31 in the accommodation 20 and the second circumferential groove 34 in the accommodation 20 ensure a fluidic connection between the radial drainage holes 18a, 18b and first switching connection HD1 or second switching connection HD2 respectively. Alternatively to the circumferential grooves 33, 34 of the accommodation 20, these circumferential grooves could also be provided as second circumferential grooves in the anchor element 15 at the respective height of radial drainage hole 18a and radial drainage hole 18b.

FIG. 10 shows the direction of flow of the hydraulic medium in the first example embodiment of the switching valve 9 according to FIG. 6 when it is in the second switched state and a second pressure chamber or second chamber is actively or passively filled with hydraulic medium and a first chamber or first pressure chamber is actively or passively drained.

The hydraulic medium flows through inlet 1 into the axial feed holes 17 via radial feed holes 16 and from there into the second gap 29. The hydraulic medium or oil respectively can then flow from the second gap 29 into the second circumferential groove 34 of the accommodation 20 and from there reach the second pressure chamber or second chamber respectively via the second switching connection 2.

Fluid from the first pressure chamber or first chamber respectively is drained via a duct to the first switching connection HD1 and reaches the first circumferential groove 33 in the accommodation 20, which is connected in fluid communication to the radial drainage holes 18a so that the oil reaches the axial drainage hole 19a through same and from there exits the switching valve 9 or the connecting rod 7 respectively. The flow of the oil is indicated in each case by arrows.

FIG. 11 shows a second example embodiment of the switching valve 9 according to the invention. This example embodiment as well preferably exhibits a single anchor as the anchor element. This anchor 15 also comprises radial drainage holes 18a, 18b and axial drainage holes 19a, 19b. A neutral switching position is also dictated in this second example embodiment by the return force of springs 21, 22 and switching positions, which can induce a change in the length L of the connecting rod 7, are also effected here by induction of electromagnetic fields in the first coil 13 and in the second coil 14, which in each case interact with the anchor 15 as an electromagnetic actuator.

In contrast to the first example embodiment of FIG. 6, however, when in the neutral position, the anchor 15 only extends axially over a small area within the coils, in particular amounting to less than the axial extension of the coils 13, 14. The cover elements 23 therefore preferably comprise extensions which extend into the interior of the coils 13, 14 to the center of the switching valve 9 and further preferably limit an axial movement of the anchor 15. Thus, when the anchor 15 is in the first or second switching position, most of the magnetic flow occurs via the cover element 23 and only a small portion via the anchor element 15.

In contrast to the first example embodiment of FIG. 6, the second example embodiment further preferably comprises a bushing 40 which is received in the accommodation 20 in the connecting rod 7 and displaceably supports the anchor 15 axially. The bushing has a circumferential groove 41 which connects inlet ducts 44 to the circumferential groove 35 of the anchor 15 in fluid communication. The bushing moreover comprises supply channels 42 configured to connect the circumferential groove 35 of the anchor 15 to the circumferential grooves 33, 34 of the accommodation 20 in fluid communication pursuant the respective switching position. Lastly, drainage channels 43 of the bushing 40 serve to connect the circumferential grooves 33, 34 of the accommodation 20 to the radial drainage holes 19a, 19b in fluid communication subject to the switching position of the anchor 15.

FIG. 12 shows a perspective view of a bushing 40 of the second example embodiment of the switching element 9 according to FIG. 11.

FIG. 13 shows a perspective view of the anchor 15 of the second example embodiment of the switching element 9 according to FIG. 11. Visible in this view of the anchor 15 is that it has second circumferential grooves 36 connecting radial drainage hole 18a and radial drainage hole 18b in fluid communication. Moreover, these circumferential grooves ensure that a fluidic connection can be established between the radial drainage holes 18a, 18b and the respective drainage channel 43 of the bushing regardless of the rotational position of the anchor 15 in relation to its axis.

In the second switched state shown in FIG. 11, in which a second pressure chamber or second chamber connected to the switching connection HD2 can be filled and a first chamber or first pressure chamber connected to switching connection HD1 can be drained, the inlet 1 is connected to the first circumferential groove 35 of the first anchor 15 in fluid communication.

On the opposite side of the anchor element 15, the first circumferential groove 35 is connected in fluid communication to supply channels 42 of the bushing 40 which are in turn connected in fluid communication to the second circumferential groove of the accommodation 20, this in turn connected to the second switching connection HD2.

The first switching connection HD1 is connected in fluid communication to the first circumferential groove 33 of the accommodation 20 which is in turn connected in fluid communication to the radial drainage hole 18a via drainage channels 43. Radial drainage hole 18a is in turn connected in fluid communication to the axial drainage hole 19a which leads into the first outlet 2.

Correspondingly, in the first (not shown) switching position of the anchor 15, the inlet 1 would be connected in fluid communication to the first circumferential groove 35 of the bushing 15 via a circumferential groove 41 of the bushing and the inlet ducts 44. The first circumferential groove 35 would in turn be connected in fluid communication to the first switching connection HD1 via the supply channels 42 of the bushing and the first circumferential groove 33 of the accommodation 20. Conversely, the second switching connection HD2 would be connected in fluid communication in this switched state to the second outlet 3 via the second circumferential groove 34, the drainage channels 43, the second circumferential groove of the anchor element 36, the radial drainage holes 18b and axial drainage hole 19b.

FIG. 14 indicates the flow of a hydraulic medium in the second switching position of the switching element 9 according to the second example embodiment using arrows. Hydraulic medium drawn or forced in from inlet 1 flows into the first circumferential groove 35 of the anchor 15 via the circumferential groove 41 of the bushing 40 and the inlet ducts 44 of the bushing 40 and from there to the other side of the anchor 15 where the hydraulic medium exits the first circumferential groove 35 via supply channels of the bushing and into the second circumferential groove 34 of the accommodation 20. From there, the hydraulic medium flows to the second pressure chamber or second chamber respectively via the second switching connection HD2.

Hydraulic medium, respectively oil, forced out of the first pressure chamber or first chamber into the first switching connection HD1 flows to the first circumferential groove 33 of the accommodation 20 and from there into the inlet duct 44 of the bushing and into a second circumferential groove 36 of the anchor element 15. From this circumferential groove 36, the hydraulic medium reaches the axial drainage hole 19a via radial drainage hole 18a and exits the switching valve 9 or the connecting rod 7 respectively from there via the first outlet 2.

One advantage the second example embodiment has over the first example embodiment is in particular that radial feed holes and axial feed holes can be omitted in the anchor element. Moreover, the anchor 15 can be of smaller and thus lighter design. This thereby reduces friction between the anchor 15 and its bearing which at high rotational speeds can lead to blockage in the worst case, but at least to impeding the movement of the anchor 15, due to the great accelerations and centrifugal forces.

FIG. 15 depicts a modified design of the second example embodiment of the switching valve 9.

This modification differs from the FIG. 11 configuration substantially in that pairs of permanent magnets are employed as restoring devices 21 and 22. Thus, for example, the permanent magnet 21b of a first restoring device is repelled by permanent magnet 21a because they are paired with opposite polarization. The same applies to permanent magnet 22b in relation to permanent magnet 22a, which are likewise paired with opposite polarization. As previously with springs 21, 22, the permanent magnets 21a and 22a are thereby supported on the cover elements 23. The anchor element 15 is preferably held in a neutral position by the restoring forces when neither of the coils 13, 14 are activated. In this neutral position, as in the previous example embodiments, both inflow as well as outflow are inhibited or blocked to/from the switching connections HD1, HD2.

When the first coil 13 is energized, the anchor element moves to the left due to the attracting action of the first coil 13 outweighing the repulsion of the magnet pair 21a, 21b. When the second coil 14 is energized, the anchor element 15 moves to the right due to the attracting action of the second coil 14 outweighing the repulsion of magnet pair 22a, 22b.

The flow of hydraulic medium through the switching valve depicted in FIG. 15 is at least substantially identical in the first and second switching position to that of the configuration according to FIG. 11.

FIG. 16 depicts a further alternative implementation of the second example embodiment of FIG. 11. The restoring devices 21, 22 are again realized as pairs of magnets 21a, 21b or 22a, 22b. In contrast to the previous alternative implementation, however, the permanent magnets of magnet pair 21a, 21b or 22a, 22b are now aligned with rectified polarization so as to attract each other.

When the first coil 13 is energized in this case, the anchor 15 moves to the left since the magnet pair 21a, 21b on the left side supports the attracting action of the first coil 13. When the second coil 14 is energized, the anchor 15 moves to the right since the right magnet pair 22a, 22b supports the attracting action of the second coil 14.

If neither of the two coils 13, 14 are energized, the anchor element 15 remains in its last position taken. There is therefore no neutral position. The implementation of FIG. 16 is therefore to be described as being bistable since the anchor 15 only has two states of equilibrium. The hydraulic medium flow through this implementation of the switching valve 9 is at least substantially identical to that of FIGS. 11 and 15.

FIG. 17 relates to a third example embodiment of the inventive switching valve 9.

This example embodiment exhibits only a single coil 13 and a single restoring device 22. In the embodiment as depicted, the restoring device is formed by pairs of permanent magnets 22a, 22b paired at the same polarization; i.e. mutually attracting.

When coil 13 is energized, the anchor 15 moves to the left because the attracting action of coil 13 is greater than the attractive force of the magnet pair 22a, 22b to the right. If the coil 13 is not energized, the anchor 15 assumes the right position due to the attractive force of the magnet pair 22a, 22b. There is also no neutral position in this example embodiment such that it also relates to a bistable switching valve 9.

The hydraulic medium flow through the switching valve 9 thereby at least substantially corresponds to that as implemented in the second example embodiment.

The magnet pair 22a, 22b can also be alternatively arranged on the left side of the switching valve 9, whereby they then have to be disposed with opposite polarization so as to mutually repel.

The third example embodiment is in particular characterized by being able to dispense with a coil and a restoring device, which makes the switching valve 9 lighter and easier to construct.

FIG. 18 shows an alternative implementation of the third example embodiment of the inventive switching valve 9 according to FIG. 17.

Instead of the magnet pair as a restoring device, a spring 21 is now provided which effects a return force between the cover element 23 and the anchor element 15.

When the coil 13 is energized, the anchor element 15 moves to the left against the spring force of the spring 21. When the coil 13 is not energized, the anchor element 15 moves to the right due to the spring force.

There is also no neutral position in this alternative implementation such that it also relates to a bistable switching valve 9 here as well.

Alternatively, spring 21 could also be replaced by a spring 22 on the left side of the switching valve 9 effecting attraction between the cover element 23 and the anchor 15 on the left. In this case, when the coil 13 is energized, the anchor 15 is pulled to the left against the spring force of the pretensioned spring 22.

FIG. 19 shows a fourth example embodiment of an inventive switching element 9. The anchor element 15 is also a single anchor in this example embodiment, one which can be moved by electromagnetic forces via coils 13, 14 into a first switching position (anchor right) and a second switching position (anchor left).

No restoring devices are utilized in this example embodiment. In the second switching position as depicted, the inlet 1 is positioned over the second gap 29 and the second passage with the axial feed hole 17 and thus also in fluidic connection with radial feed hole 16 such that the inlet 1 is connected in fluid communication to the second switching connection HD2.

FIG. 20 depicts the flow of a hydraulic medium or oil respectively through the switching valve 9 pursuant to the fourth example embodiment. Same flows through the inlet 1 and the second gap 29 into the second passage 39 and from there through the axial feed hole 17 into the radial feed hole 16 where the hydraulic medium exits the switching valve through the second switching connection HD2. In the first switching position, the hydraulic medium would correspondingly flow from the inlet through the first gap 28 (not shown) into the openings of the first passages 38 and from there into the axial feed hole 17 and via the radial feed hole 16 to the first switching connection HD1 where the oil would exit the switching valve 9.

The drainage of a hydraulic device 8 or an actuating valve 12 in the fourth example embodiment preferably occurs separately from the switching valve 9.

FIG. 21 shows a fifth example embodiment of an inventive switching valve 9.

The anchor element 15 in this example embodiment consists of two anchors, a first anchor 15a and a second anchor 15b. These anchors 15, 15b extend in the axial direction of the switching valve 9 and span the first coil 13 and the second coil 14 via cylindrical extensions.

A first spring is arranged between the cylindrical extension of the first anchor 15a and the first coil 13 as restoring device 21, a second spring is arranged between the cylindrical extension of the second anchor 15b and the second coil 14 as second restoring device 22. The springs respectively support the anchors 15a, 15b against a center section 24 of the accommodation. Anchor 15a is guided by the center section 24 and a first closure element 25, the second anchor 15b by the center section 24 and a second closure element 26.

The springs 21, 22, which are biased against the cylindrical extensions of the anchors 15a, 15b, keep the respective anchor 15a, 15b in a defined position, in particular a neutral position. The closure elements 25, 26 limit the outward movement of the anchors 15a, 15b and support or respectively guide the anchor together with the center section 24.

The closure elements comprise radial drainage holes 18 and axial drainage holes 19 which are respectively connected in fluid communication to the first connection HD1 and the second connection HD2. The axial drainage holes can be connected in a fluid-communicating manner both to the outlets 2, 3 as well as, in the respective other switching position of the anchors 15a, 15b, to gaps 28, 29 able to be connected in a fluid-communicating manner to the inlets 1 via cavities 27 in the anchors 15a, 15b. In this way, the drainage holes can also be used as a supply line to the switching connections HD1 and HD2.

When the first coil 13 is energized, it attracts the first anchor 15a and when the second coil 14 is energized, it attracts the second anchor 15b. When not energized, both coils 13, 14 are inactive and the springs 21, 22 press both anchors 15a, 15b against the opening of the axial drainage 19. In doing so, neither a supplying nor a draining of the switching connections HD1, HD2 is possible such that a connection rod length is kept constant. This corresponds to a neutral switching position.

In FIG. 21, the first anchor 15a is in the drainage switching position; i.e. the hydraulic fluid can escape via the axial drainage hole 19 and the first outlet 2. The second anchor 15b is in a supply switching position such that the right inlet 1 is connected in fluid communication to the second switching connection HD2 via the cavity 27 and the gap 29 as well as the radial drainage hole 18. The axial drainage holes 19 are closed on the right side by the second covering element 32 which is held by a spring plate 45.

FIG. 22 shows a side view of the elements of the switching valve 9 according to FIG. 21 without accommodation 20. FIG. 23 shows a perspective top view of the anchor 15b. The cylindrical extension into which the cavities 27 are inserted is clearly visible. FIG. 24 shows a section through the switching element 9 along the D-D sectional plane.

FIG. 25 again shows a view as per FIG. 21 of the fifth example embodiment, wherein the flow of hydraulic medium is indicated by arrows. In the depicted switching position of the first anchor 15a and the second anchor 15b, hydraulic medium can penetrate into the axial holes 19 through the cavity 27 and the second gap 29 via inlet 1 and from there reach the second switching connection HD2 via the radial holes 18 as well as a circumferential groove 30 of the closure element 31. Conversely, hydraulic medium can exit out of the second outlet 2 from the first switching connection HD1 via the radial holes 18 of the first closure element 25 and its axial hole 19, as indicated by the arrows.

FIG. 26 shows a sixth example embodiment of the inventive switching element 9. As in the fifth example embodiment of FIGS. 21 and 25, the anchor element 15 in this example embodiment also consists of two anchors 15a, 15b able to be moved in each case between two switching positions.

When the first coil 13 is activated, the first anchor element 15a overcomes the return force of the spring 21 and is attracted to the first coil 13. A gap 28 (not shown) thereby forms and the first outlet 2 is blocked. When the second coil 14 is activated, the second gap 29 is open and the second outlet 3 is blocked.

The closure elements 25, 26 also exhibit radial holes 18 and axial holes 19 in this example embodiment. As in the fifth example embodiment, the covering elements 31, 32 act in concert with the anchors 15a, 15b via spring plate 45 and retaining elements 37 such that the covering elements 31, 32 are moved along together with a movement of anchors 15a, 15b.

The first coil 13 is activated in a supply switching position for the first switching connection HD1 so that a gap 28 (not shown) is formed between the anchor 15a and the first closure element 25 and at the same time, the axial drainage bow 19 in the first closure element 25 is blocked by the first cover element. The first switching connection HD1 is now connected in fluid communication to the inlet 1 via the first circumferential groove 33 in the accommodation 20 by way of the first gap 28, first passages 38 as well as the radial drainage hole 18. Reversely, the first switching connection HD1 becomes fluidically connected to the first outlet 2 in the drainage switching position of the first anchor 15a shown in FIG. 26 via the radial drainage hole 18 and the axial drainage holes 19 as the axial holes 19 are not closed by the first cover element. The second anchor 15b also has corresponding switching positions.

FIG. 27 indicates the hydraulic medium flow in switching valves 9 in the switched state according to FIG. 26 of the sixth example embodiment using arrows.

The hydraulic medium can reach the second gap 29 via the inlet 1 as well as a second circumferential groove 34 of the accommodation 20 and from there into the radial hole 18 via the second passages 39, from where the hydraulic medium can flow to the second switching connection HD2. On the other side, hydraulic medium can reach the axial drainage holes 19 from the first switching connection HD1 via the radial drainage hole 18 and from there exit out of the first outlet 2.

FIG. 28 shows a length-adjustable connecting rod 7 for a reciprocating piston engine, for example an internal combustion engine. The connecting rod 7 has a first rod part 7a in the region of a large connecting rod eye 46 and a second rod part 7b in the region of a small connecting rod eye 47, the large connecting rod eye 46 being a crank pin bearing for connection to a crankshaft (not shown) and the small connecting rod eye 47 being a piston pin bearing for connection with a piston, not shown.

The two rod parts 7a, 7b can be displaced relative to one another in the direction of the longitudinal axis 50a of the connecting rod 7 via a helical gear 49. The helical gear 49 has a first gear part 50 and a second gear part 51 which is engaged with the first gear part 50, one of the two gear parts 50, 51 being designed as a spindle nut 52 and the other gear part 51, 50 being designed as a threaded spindle 53. In the embodiment variants shown, the first gear part 50 is designed as a sleeve-like spindle nut 52 and the second gear part 51 as a threaded spindle 53.

The spindle nut 52 has on its inside active surfaces with a pitch, which are spaced from the longitudinal axis 50a of the connecting rod 7 and which are designed as internal screw threads with one thread or several threads, or as internal helical teeth. Corresponding to this, the threaded spindle 53 has corresponding active surfaces on its outside with a pitch, which are spaced from the longitudinal axis 50a of the connecting rod 7 and which are designed as external screw threads with one thread or several threads, or as external helical teeth. The thread, in particular the pitch of the thread, is preferably designed such that self-locking is reliably avoided. Self-locking can usually be avoided if the gradient angle is greater than 7°. On the other hand, the lead angle should not be too large to limit the torque that occurs. In one exemplary embodiment, an optimal pitch angle was selected at approximately 8°.

The term "thread" (for example, in a threaded spindle) is generally used here both for screw threads and for helical gears and thus covers both types.

The first gear part 50 formed by the spindle nut 52 is rotatable but axially immovable in a guide cylinder 48 formed by the first rod part 7a and designed as a blind hole. The axial position of the first gear part 50 is limited in the direction of the small connecting rod eye 47 by a clamping sleeve 56 which closes the space between an upper end of the guide cylinder 48 and a spacer ring 57.

The first gear part 50 of the screw gear 49 is rotatable but axially immovable in the first rod part 7a. The second gear part 51 of the screw gear 49 is displaceable in the direction of the longitudinal axis 50a, but is mounted in the first rod part 7a in a rotationally fixed manner. The second gear part 51 is fixedly connected to the second rod part 7b or is embodied integrally therewith. The anti-rotation device 54, prevents the second gear part 51 from rotating and at the same time forms a stroke limitation for the second rod part 7b. The anti-rotation device 54 can be formed by a simple screw which is screwed into the first rod part 7a transversely to the longitudinal axis 50a. It interacts with a corresponding longitudinal groove 55 in the second rod part 7a.

The first gear part 50 is connected to at least one turn lock device 58 which can be switched by means of at least one switching device, which prevents the first gear part 50 from rotating in at least one direction of rotation in at least one first position and enables it in at least a second position.

The rotary locking device 58 has at least a first freewheel device 59 and a second freewheel device 60, which are designed, for example, as ratchet freewheels. Each of the freewheel devices 59, 60 forms a clutch for transmitting a torque, which transmits torque in one direction of rotation, i.e. "locks" and transmits no torque in the opposite direction of rotation, i.e. "runs freely". The first freewheel device 59 and the second freewheel device 60 can be of essentially the same design, but can be arranged one above the other in an inverted manner, so that the blocking and releasing directions of rotation are opposite.

Each freewheel device 59, 60 can be blocked at least in one direction of rotation by means of at least one switching device 30, in that a temporary rotationally fixed connection is established with the first or second rod part 7a, 7b.

The example embodiments described are only examples which are not in any way intended to limit the scope, applicability or configuration of the invention. Rather, the foregoing description provides those skilled in the art with a guide for realizing at least one example embodiment, whereby modifications, in particular combinations of individual features from different example embodiments, may be made in respect of the function and arrangement of the component parts as described without departing from the scope of protection as disclosed.

LIST OF REFERENCE NUMERALS 1 inlet
2 first outlet
3 second outlet
HD1 first switching connection
HD2 second switching connection
L connecting rod length
7 connecting rod
8 hydraulic device
9 switching valve
10 hydraulic medium supply line
11 drainage line
12 closing valve
13 first coil
14 second coil
15 anchor element
15a first anchor
15b second anchor
16 radial feed hole
17 axial feed hole
18a, 18b radial drainage hole
19a, 19b axial drainage hole
20 accommodation
21 first restoring device
22 second restoring device
23 cover element
25 center section of accommodation
25 first closure element
26 second closure element
27 cavity
28 first gap
29 second gap
30 closure element groove
31 first covering element
32 second covering element
33 first circumferential groove of the accommodation
34 second circumferential groove of the accommodation
35 first circumferential groove of an anchor element
36 second circumferential groove of the anchor element
37 retaining element
38 first passage
39 second passage
40 bushing
41 circumferential groove of bushing
42 bushing supply channel
43 bushing drainage channel
44 bushing inlet duct
45 spring plate
46 large connecting rod eye
47 small connecting rod eye
48 guide cylinder of rod
49 screw gear
50 first gear part
50a gear axis of rotation
51 second gear part
52 spindle nut
53 threaded spindle
54 anti-rotation device
55 longitudinal groove
56 clamping sleeve
57 spacer ring
58 rotary locking device
59 first freewheel device 60 second freewheel device
61 first inner ring
62 second inner ring
63 outer ring
64 cavity
65 coupling element
66 central bolt
67 spring
68 inner circumference of eye
69 piston surface
70 pressure chamber

What is claimed is:

1. A length-adjustable connecting rod for a reciprocating piston engine comprising:
   a hydraulic device with which a length of the connecting rod can be adjusted; and
   a switching valve for controlling an inflow and an outflow of a hydraulic medium into or out of the hydraulic device,
   wherein the switching valve can be actuated electromagnetically, the switching valve comprising:
   an inlet;
   a first outlet;
   a second outlet;
   a first switching connection, which is connected in fluid communication to the inlet in a first switched state of the switching valve and to the first outlet in a second switched state of the switching valve; and
   a second switching connection, which is connected in fluid communication to the inlet in the second switched state of the switching valve or to the second outlet in the first switched state of the switching valve,
   wherein the switching valve is connected in fluid communication to the hydraulic device via the first switching connection and the second switching connection.

2. The length-adjustable connecting rod according to claim 1,
   wherein the connecting rod comprises a first connecting rod section and a second connecting rod section,
   wherein the first and second connecting rod sections are displaceable relative to each other for adjustment of a connecting rod length,
   wherein the hydraulic device comprises a first hydraulic cylinder having a first pressure chamber and a second pressure chamber separated by a piston, wherein one of the first and second connecting rod sections is connected to the first hydraulic cylinder and the other of the first and second connecting rod sections is connected to the piston, and
   wherein the connecting rod comprises a hydraulic medium supply line and/or a drainage which can be connected to the first pressure chamber and/or the second pressure chamber in fluid communication.

3. The length-adjustable connecting rod according to claim 1,
   wherein the connecting rod comprises a first connecting rod section having a spindle nut and a second connecting rod section having a threaded spindle,
   wherein the spindle nut and the threaded spindle engage and are rotatable relative to each other for adjusting the connecting rod length, and
   wherein the hydraulic device is configured to affect a relative rotation of the spindle nut and the threaded spindle, and wherein the connecting rod comprises a hydraulic medium supply line and/or a drainage which can be connected to the hydraulic device in fluid communication.

4. The length-adjustable connecting rod according to claim 3,
   wherein the hydraulic device further comprises an actuating valve, wherein the switching valve is designed to hydraulically actuate the actuating valve and the actuating valve is designed to open/close fluidly communicating connections between the hydraulic medium supply line and/or the drainage and the two pressure chambers or to generate a relative rotation between the spindle nut and the threaded spindle.

5. The connecting rod according to claim 4, wherein the actuating valve comprises a second hydraulic cylinder having a first chamber and a second chamber, separated by a control piston, wherein the control piston is configured to actuate at least one closing valve or is non-rotatably connected to the spindle nut or the threaded spindle.

6. The length-adjustable connecting rod according to claim 1,
   wherein a first pressure chamber or a first chamber is connected to the first switching connection and a second pressure chamber or a second chamber to the second switching connection in fluid communication.

7. The length-adjustable connecting rod according to claim 1, wherein the switching valve has a neutral position in which the inflow and outflow into and out of the hydraulic device is prevented and no electromagnetic actuation of the switching valve occurs.

8. The length-adjustable connecting rod according to claim 1, wherein the switching valve comprises:
   a first coil; and
   an anchor element which comprises a ferromagnetic or magnetizable material and is movable between exactly two switching positions.

9. The length-adjustable connecting rod according to claim 8,
   wherein the anchor element and the first coil are supported in a common accommodation, and
   wherein the anchor element is held in a first switching position by a single first restoring devices which interacts with the common accommodation.

10. The length-adjustable connecting rod according to claim 9, wherein the anchor element comprises a first anchor and a second anchor, each supported by a restoring device at a center section of the accommodation.

11. The length-adjustable connecting rod according to claim 10, wherein at least one cavity is formed between the first and second anchors and the accommodation which is formed in the first and second anchors.

12. The length-adjustable connecting rod according to claim 10 which comprises two closure elements, wherein a first closure element is arranged opposite a center section of the accommodation with respect to the first anchor and wherein a second closure element is arranged opposite the center section with respect to the second anchor.

13. The length-adjustable connecting rod according to claim 12, wherein the first closure element comprises radial bores and axial bores connected to one another and which connect the inlet and the first switching connection in fluid communication in the first switched state and connect the first outlet and the first switching connection in fluid communication in the second switched state, and wherein the second closure element comprises radial bores and axial bores which connect the inlet and the second switching connection in fluid communication in the second switched state and the second outlet and the second switching connection in fluid communication in the first switched state.

14. The length-adjustable connecting rod according to claim 13, wherein the first closure element and the second closure element comprise grooves which are configured in each case to connect multiple radial bores together in fluid communication.

15. The length-adjustable connecting rod according to claim 13, which comprises a first covering element which closes the axial bores of the first closure element against an exterior of the switching valve in the first switched state and a second covering element which closes the axial bores of the second closure element against the exterior of the switching valve in the second switched state.

16. The length-adjustable connecting rod according to claim 12, wherein the anchor elements are guided by the closure elements and/or by the accommodation.

17. The length-adjustable connecting rod according to claim 13,
wherein a first gap is formed between the first closure element and the first anchor in the first switched state which connects the inlet to the radial bores and axial bores of the first closure element in fluid communication, and
wherein a second gap is formed between the second closure element and the second anchor in the second switched state which connects the inlet to the radial bores and axial bores of the first closure element in fluid communication.

18. The length-adjustable connecting rod according to claim 17, wherein a first passage is arranged between the first anchor and the first closure element which connects the first gap to the first switching connection, and wherein a second passage is arranged between the second anchor and the second closure element which connects the second gap to the second switching connection.

19. The length-adjustable connecting rod according to claim 17, wherein the accommodation comprises at least one circumferential groove in an area in which the inlet is arranged, which is divided into two intake tubes, wherein the circumferential groove is configured to connect the first gap between the first closure element and the first anchor and/or the second gap between the second closure element and the second anchor to the inlet in fluid communication.

20. The length-adjustable connecting rod according to claim 8, wherein the switching valve further comprises:
a second coil distanced from the first coil, and
wherein the anchor element is movable between at least two switching positions.

21. The length-adjustable connecting rod according to claim 20, wherein the anchor element and the first and second coils are supported in a common accommodation, and wherein the anchor element is held in a neutral switching position by two restoring devices.

22. The length-adjustable connecting rod according to claim 8, wherein the anchor element comprises at least one radial feed hole and at least one axial feed hole which are connected in fluid communication and configured to fluidly connect the inlet to the first switching connection or to the second switching connection.

23. The length-adjustable connecting rod according claim 22, wherein the anchor element exhibits a first circumferential groove which connects radial feed holes together in fluid communication.

24. The length-adjustable connecting rod according to claim 8, wherein the anchor element comprises at least one radial drainage hole and at least one axial drainage hole which are connected in fluid communication and configured to fluidly connect the first switching connection to the first outlet and the second switching connection to the second outlet.

25. The length-adjustable connecting rod according to claim 8, wherein the anchor element comprises two axial drainage holes, and wherein radial drainage holes are connected to either a first axial drainage hole or a second axial drainage hole, wherein the radial drainage holes connected to the different axial drainage holes each lie in a different axial plane with respect to the anchor element.

26. The length-adjustable connecting rod according to claim 25, wherein at least one radial drainage hole connected to the second axial drainage hole connects the second switching connection to the second outlet in the first switched state, and wherein at least another one radial drainage hole connected to the first axial drainage hole connects the first switching connection to the first outlet in the second switched state.

27. The length-adjustable connecting rod according to claim 8, wherein the anchor element exhibits a first circumferential groove which is configured to fluidly connect the inlet to the first switching connection in the first switched state and to the second switching connection in the second switched state.

28. A reciprocating piston engine comprising a length-adjustable connecting rod according to claim 1.

29. A length-adjustable connecting rod for a reciprocating piston engine comprising:
a hydraulic device with which a length of the connecting rod can be adjusted; and
a switching valve for controlling an inflow and an outflow of a hydraulic medium into or out of the hydraulic device,
wherein the switching valve can be actuated electromagnetically,
wherein the connecting rod comprises a first connecting rod section having a spindle nut and a second connecting rod section having a threaded spindle,
wherein the spindle nut and the threaded spindle engage and are rotatable relative to each other for adjusting the length of the connecting rod,
wherein the hydraulic device is configured to affect a relative rotation of the spindle nut and the threaded spindle, and
wherein the connecting rod comprises a hydraulic medium supply line or a drainage which can be connected to the hydraulic device in fluid communication.

* * * * *